United States Patent
MacGregor et al.

(12) 
(10) Patent No.: US 6,450,587 B1
(45) Date of Patent: *Sep. 17, 2002

(54) VEHICLE BRAKE SAFETY SYSTEM APPARATUS AND METHODS

(75) Inventors: G. David MacGregor, Cascade, ID (US); Noble Hamilton, Cascade, ID (US); Dale Maslonka, Horseshoe Bend, ID (US)

(73) Assignee: 55 Brake Company, Cascade, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/724,761

(22) Filed: Nov. 28, 2000

Related U.S. Application Data

(63) Continuation-in-part of application No. 09/521,824, filed on Mar. 9, 2000, which is a continuation-in-part of application No. 09/108,863, filed on Jul. 1, 1998, now abandoned.

(51) Int. Cl.$^7$ ................................................ B60R 25/08
(52) U.S. Cl. ............................................................. 303/89
(58) Field of Search ............................ 303/122.09, 89; 180/281, 282, 287, 289; 307/10.2; 701/70; 340/428–462, 426, 427

(56) References Cited

U.S. PATENT DOCUMENTS

| | | | |
|---|---|---|---|
| 1,675,465 A | 7/1928 | Roehrich | 70/127 |
| 3,000,459 A | 9/1961 | Silver et al. | 180/82 |
| 3,174,502 A | 3/1965 | Howarth et al. | 137/351 |

(List continued on next page.)

FOREIGN PATENT DOCUMENTS

| | | | |
|---|---|---|---|
| DE | 43 42 543 A1 | 6/1995 | A61G/3/04 |
| GB | 2 205 620 A | 12/1988 | B60T/17/16 |
| GB | 2 265 679 A | 10/1993 | B60R/25/08 |
| GB | 2 268 608 | 1/1994 | G07C/5/08 |
| GB | 2 340 902 | 3/2000 | B60T/7/22 |
| WO | WO 86/04869 | 8/1986 | B60T/13/66 |
| WO | WO 98/16411 | 4/1998 | B60R/25/04 |

OTHER PUBLICATIONS

Copy of Safety Systems and Controls, Inc. "Web Page" printed from Internet on Mar. 19, 2000.
Wiring Schematics of 1998 Thomas Bus from dealer's manual. Date of Publication unknown.

*Primary Examiner*—Paul N. Dickson
*Assistant Examiner*—C. T. Bartz
(74) *Attorney, Agent, or Firm*—Pederson and Company, LLC; Ken J. Pedersen; Barbara S. Pedersen

(57) ABSTRACT

A safety-enhancing automatic brake control system automatically applies and maintains the brakes in the applied state, when one or more conditions exist at various stations around/in the vehicle or equipment that make vehicle movement dangerous. A preferred controller electrically, electronically, or otherwise connects to various sensors at the vehicle stations, validates the signal(s), and then actuates a mechanism that manages the air, brake fluid, mechanical brake linkage/cable, electric, or other mechanism that applies the brakes. In an air brake system, a solenoid valve blocks and vents the air line to release a piston that normally counteracts a spring mechanism. In a hydraulic brake system, a piston or spring, for example, powers a secondary piston rod and piston in a master cylinder to apply the brakes. In the case of a spring-actuated system, a release unit such as a piston may be used to counteract the spring for releasing the brakes. If the driver does not manually set the parking brake when appropriate, the invented control system automatically sets a brake as soon as a potentially dangerous condition is sensed and validated by the invented controller. The control system preferably includes a vehicle motion override system that prevents automatic application of the brakes if the vehicle is in motion above a set speed, and a manual brake-releasing override that allows a driver to override the controller temporarily at the driver's discretion.

43 Claims, 16 Drawing Sheets

U.S. PATENT DOCUMENTS

| | | |
|---|---|---|
| 3,508,625 A | 4/1970 | Hawkins .................... 180/114 |
| 3,579,285 A | 5/1971 | Verdier ....................... 307/10 |
| 3,937,295 A | 2/1976 | Wright ................ 180/103 BF |
| 4,074,787 A | 2/1978 | Cunningham et al. ...... 180/286 |
| 4,136,752 A | 1/1979 | Friesen et al. .............. 180/101 |
| 4,200,167 A | 4/1980 | Cockman, Jr. .............. 180/281 |
| 4,258,819 A | 3/1981 | Baptiste, Sr. ............... 180/287 |
| 4,519,653 A | 5/1985 | Smith .......................... 303/89 |
| 4,721,192 A | 1/1988 | Cano et al. ................. 188/353 |
| 4,779,433 A | 10/1988 | Lëgarë ....................... 70/211 |
| 4,812,777 A | 3/1989 | Shirai ......................... 303/14 |
| 4,824,178 A | 4/1989 | Petersen ..................... 303/15 |
| 4,838,617 A | 6/1989 | Deitchman et al. .......... 202/6.1 |
| 4,864,298 A | 9/1989 | Dombrowski ............... 340/904 |
| 4,934,492 A | 6/1990 | Hayes-Sheen ............. 188/353 |
| 5,002,345 A | 3/1991 | Becker ....................... 303/119 |
| 5,036,961 A | 8/1991 | Eberling et al. ........... 192/1.23 |
| 5,041,810 A | 8/1991 | Gotanda ..................... 340/426 |
| 5,085,061 A | 2/1992 | Maudsley .................... 70/225 |
| 5,370,449 A | 12/1994 | Edelen et al. .................. 303/3 |
| 5,505,528 A | 4/1996 | Hamman et al. ............. 303/89 |
| 5,533,795 A | 7/1996 | Brooks ........................ 303/6.1 |
| 5,560,233 A | 10/1996 | Watkins ....................... 70/177 |
| 5,570,756 A | 11/1996 | Hatcher ..................... 188/353 |
| 5,584,538 A | 12/1996 | Takasaki ...................... 303/89 |
| 5,624,352 A | 4/1997 | Smale ......................... 477/197 |
| 5,675,190 A | 10/1997 | Morita ...................... 307/10.1 |
| 5,688,027 A | 11/1997 | Johnson ....................... 303/89 |
| 5,706,909 A | 1/1998 | Bevins et al. ............... 180/273 |
| 5,839,304 A | 11/1998 | Wills .......................... 70/175 |
| 5,912,615 A | 6/1999 | Kretzmar et al. ........... 340/426 |
| 5,934,768 A | 8/1999 | Miyake ................. 303/122.09 |
| 5,942,972 A * | 8/1999 | Kaner ......................... 340/479 |

* cited by examiner

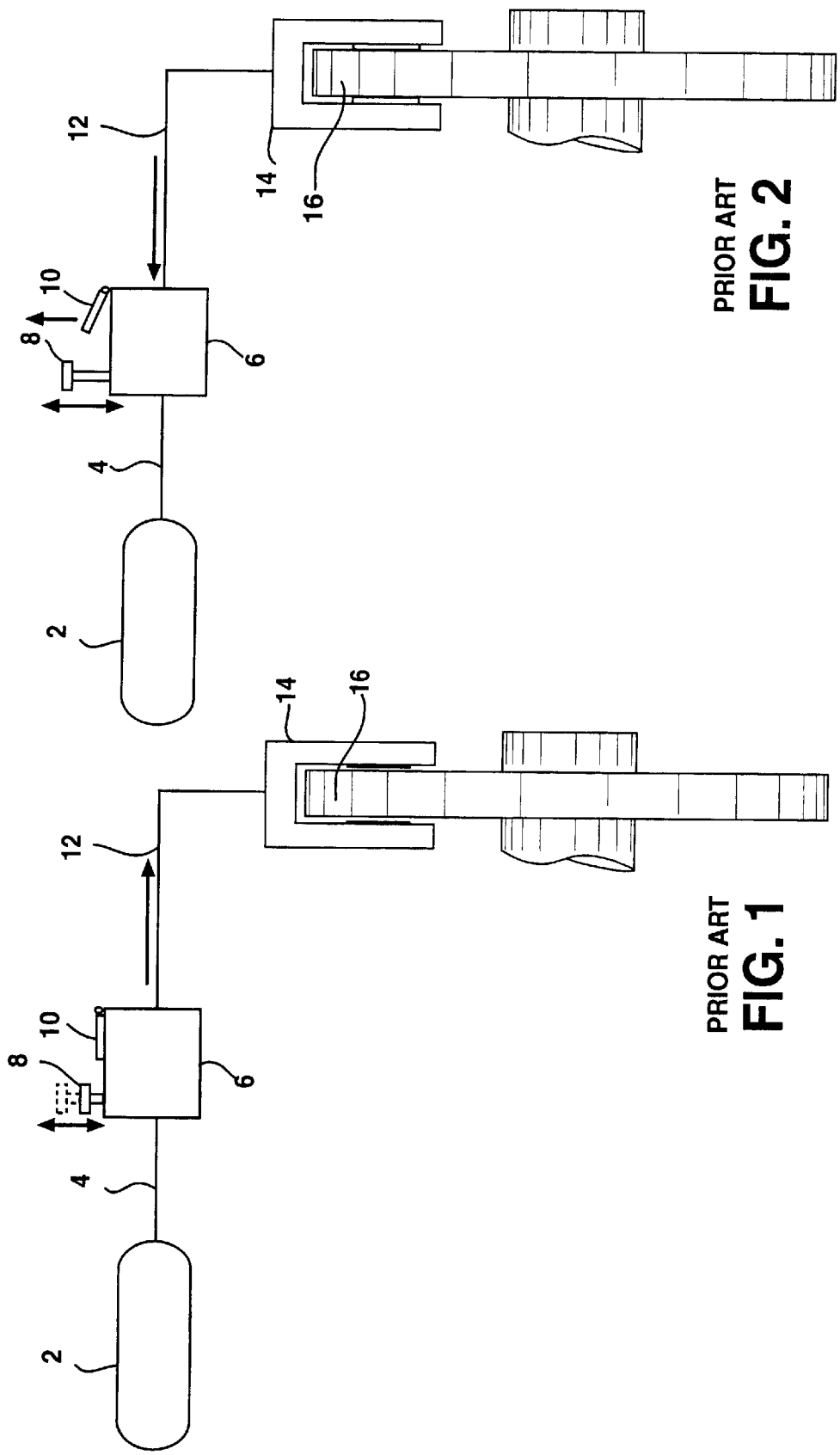

VEHICLE BRAKE SAFETY SYSTEM APPARATUS AND METHODS

This application is a continuation-in-part of prior, co-pending application Ser. No. 09/521,824, filed Mar. 9, 2000, entitled "Apparatus and Methods for Automatic Engagement and Locking of Vehicle Air Parking Brake," which is a continuation in part of prior application Ser. No. 09/108,863, filed Jul. 1, 1998, now abandoned and entitled "Automatic Air Parking Brake Lock," which applications are herein incorporated by reference.

BACKGROUND OF THE INVENTION

1. Field of the Invention

This invention generally relates to braking systems for vehicles. More particularly, this invention relates to a control system for automatically applying and "locking" a vehicle brake in an applied condition during times when it is not safe for the vehicle to move. The invention may be adapted for use with brakes of various types, for example, air parking brakes or mechanical parking brakes, or by adapting a hydraulic "application" brake, an air "application" brake, or an electric brake to serve as a parking brake. The automatic application and locking of a vehicle brake may be actuated by signals from various sensors/switches inside and outside the vehicle.

2. Related Art

Commercial and public transportation vehicles typically utilize the following types of conventional brakes:

1) Air parking brakes utilize an air-controlled spring system that cooperates with the brake shoes of a vehicle's back wheels. Air parking brake systems exist in commonly-used commercial vehicles, such as trucks, commercial buses, or school buses. The air parking brake system comprises an air source, the spring mechanism, and an air control valve called an "air loading valve" between the air source and the spring mechanism. The air loading valve is controlled only by a manual handle, which is in the vehicle cab on the dashboard or in other positions accessible to the operator. The loading valve manual handle works in a "Pull To Apply" and "Push To Release" manner. Pulling the handle closes the air loading valve, whereby air pressure from the air source is blocked and downstream air pressure is vented so that the springs move to a position that applies the brake. Pushing the handle opens the air loading valve and closes the vent, whereby air is supplied to the spring mechanism so that the springs move to a position that releases the brake.

2) Air application brakes, sometimes called "foundation brakes," are the conventional means, in vehicles with air brakes, to slow and stop the vehicle, for example, during normal "stop and go" driving. The "air application brakes" are operated by a foot-actuated air control valve, which allows incremental application of the brakes depending on how far the operator has pushed on the foot pedal.

3) Mechanical parking brakes utilize a mechanical linkage or a cable, to operatively connect a manual handle in the vehicle cab either to brake shoes at the rear wheels, or to external brake bands or internal brake shoes working with a brake drum mounted on the drive line. The manual handle is typically either a pull-on hand-operated handle, or a push-on foot-operated pedal.

4) Hydraulic "application" (or "foundation") brakes are the conventional means, in vehicles with mechanical parking brakes, to slow and stop the vehicle during normal driving. A hydraulic application brake system typically comprises a master brake cylinder for applying hydraulic force to brake shoes at the wheels, and a manual foot-pedal for actuating the master cylinder. Pushing on the brake pedal causes the brake cylinder to increase the fluid pressure in the line to the brake shoes at the wheel, which inhibits the rotation of the wheel to a incremental amount depending on how far the operator has pushed on the brake pedal. When the pedal is released, the master cylinder retracts to reduce or eliminate the pressure in the brake line, disengaging the brake shoe pads from contact with the brake drum and thereby allowing unhindered rotation of the wheel. Hydraulic application brakes are used in most family cars, sport utility vehicles, pick-ups, vans, and larger vehicles such as some school buses.

Regarding Vehicle Movement during Unsafe Conditions

Conditions may exist in or around a vehicle that make it unsafe for the vehicle to be in motion. Conventional safeguards against vehicle movement when such a condition exists are inadequate, at least in part because the safeguards typically depend on the driver taking appropriate action. This invention, without requiring driver action or involvement, automatically detects such conditions and automatically applies or locks the brakes, thereby preventing potentially unsafe vehicle movement.

Vehicle movement when conditions exist that potentially make such movement unsafe are generally the result of (1) the driver's failure to properly apply or engage the parking brake or application/foundation brake system, (2) a third party's intentional release or interference with the parking brake, or (3) the driver's failure, whether intentional or inadvertent, to detect and/or react to conditions which may make vehicle movement unsafe.

Examples of potentially dangerous conditions where movement of a vehicle may be unsafe include but are not limited to the following:

- A driver leaves a vehicle, or is otherwise not in a position to safely operate the vehicle and fails to properly set the parking brake.
- A driver attempts to put a vehicle in motion when people are attempting to enter or leaving the vehicle.
- A driver attempts to put a vehicle in motion with a door open, wheel chair ramp in use, luggage compartment unlatched, or other equipment similarly not in a safe operating mode.
- A driver puts a vehicle in motion when an object is in close proximity creating the potential for a collision. Examples include a driver failing to notice a pedestrian stepping in front of a bus or a child playing behind a parked car.
- A driver's ability to recognize the existence of an unsafe condition is impaired. Examples include radio noise masking the warning whistle of a train at a railroad crossing, a driver who is intoxicated, or a passenger who has not fastened safety restraints.
- A vehicle that is approaching too close to an object, such as a truck backing up to a loading platform.
- A vehicle with equipment that has failed or is not within acceptable safety ranges, such as loss of tire or oil pressure.
- An unauthorized driver is attempting to move or steal the vehicle.

Patent Literature

There are instances of parking brake locking systems in the patent literature, but none are as effective and safe as that of the present invention. None of the prior art locking systems includes the comprehensive safety features of the present invention.

There are inventions for the automatic engagement of parking brakes upon the turning off of an ignition or engine key switch. U.S. Pat. No. 5,624,352 (Smale) discloses an "ignition-controlled parking brake interlock." This lever and latch interlock invention is activated by turning off the vehicle ignition key. U.S. Pat. No. 5,675,190 (Morita) discloses an "operating apparatus for parking brake and method for releasing parking brake." The Morita invention uses a combination of the vehicle ignition key switch, with ON-OFF positions, and a three-way parking brake switch with ON-OFF-RESET positions, to engage the parking brake. A drawback of the Morita invention is the complexity incumbent in the use of its multiple switches.

U.S. Pat. No. 4,519,653, issued to Smith, discloses an anti-theft lock device, which includes a solenoid for attachment to the outer end of a conventional loading valve. When de-energized, the solenoid moves a lock member into the path of the valve actuating member of the conventional loading valve, physically blocking the actuating member so that it cannot be pushed in to disengage the parking brake. If the conventional loading valve has been disengaged prior to de-energizing of the solenoid, then the solenoid and its lock member are ineffectual, in that the lock member merely slideably contacts the side of the valve actuating member in a non-interfering relationship, and, hence, does not apply the brake or have any effect on the brake. Thus, the Smith device may be used as an anti-theft device, after the driver has manually pulled on the brake and turned off the ignition, but it does not have the automatic emergency safety features of the present invention.

Brooks, U.S. Pat. No. 5,553,795, illustrates a safety system with seat and door control. Brooks includes circuitry that places a weight-sensor switch in the driver's seat assembly parallel with door switch circuitry. This way, if the driver is absent from his/her seat and the door is open, the circuit is opened and a solenoid in the air line to the brakes closes. If the driver is in his/her seat, the circuit stays closed even if the door is open, or, if the door is shut, the circuit stays closed even if the driver is out of the seat.

Green, UK Patent Application GB 2 265 679, discloses an apparatus which has a multiple-position switch, which, in a first position, de-energizes a solenoid valve to block air to the brakes, and, in a second position, also cuts off electricity to the engine starting system and cuts off fuel supply to the engine.

Therefore, some inventions exist for the control of brakes for safety and theft-deterrence, but there is still a need for a versatile, reliable system that is compatible with various types of existing brake technology. There is still a need for a comprehensive automatic brake control system to prevent vehicle movement during potentially unsafe conditions at various stations inside, outside, or around the vehicle, and to better inform the vehicle operator of the potentially unsafe conditions. There is a need for a control system that automatically applies a brake and "locks" it in the "on" condition throughout the duration of potentially unsafe situations, and that also prevents automatic setting of the brake while the vehicle is traveling. There is a need for such a control system that does not require driver action or involvement, but that does allow an authorized driver to override the automatic systems under some circumstances. The present invention meets these needs.

SUMMARY OF THE INVENTION

The present invention is a brake control system that automatically detects potentially unsafe conditions and then enhances safety by automatically applying a brake and maintaining the brake in the applied position ("locking the brake") and/or by controlling other equipment. An object of the present invention is to provide an automatic control system that requires little driver action or involvement. An object of the invention is to enable sensors to detect the potentially unsafe conditions in or around the vehicle, to automatically alert the driver to the existence of such conditions through visual and or audio or other means, and, when appropriate, to automatically control the brakes and/or other equipment. Potentially dangerous conditions may include, for example: 1) equipment-related conditions such as a driver exiting the vehicle without applying the parking brake or without turning off the vehicle; operating a disabled person's lift; passengers entering and exiting the vehicle; engine or other vehicle malfunctions detected by diagnostic sensors; or a driver being distracted by radios, cell-phones, or monitor screens; or 2) undesirable- or dangerous-driver-related conditions such as a driver failing a breath alcohol test or an identity test. Other objects of the invented control system may include preventing the brake from being automatically set while the vehicle is moving, and allowing a driver to override the automatic control system during some circumstances.

As a result of these and other objects of the invention, the invented system allows a vehicle operator to focus more on safe driving and vehicle operation, whether traveling or parked, and on the surrounding conditions, rather than on repeated manual operation of the parking brake, and repeated checking of the parking brake handle position. With fewer distractions, and fewer responsibilities for accidental misuse or release of the parking brake, the vehicle operator can perform his/her job more safely. Further, elimination of the frequent pulling and pushing of the parking brake manual handle may reduce carpal tunnel syndrome in veteran drivers.

The invented control system comprises a "management mechanism" for applying a brake, a controller with the logic that decides when the brake should be applied and that electronically actuates the management system to apply the brake, and various circuits and sensors for linking the controller to the various stations inside, outside, and around the vehicle. The invented controller may be used with a variety of existing brake systems, by adapting the management mechanism for the particular type of brake system being used.

In vehicles containing an air parking brake, the invented controller preferably controls a vented solenoid valve that replaces the conventional loading valve in the air line to the spring mechanism.

In vehicles containing a hydraulic application brake system and a mechanical parking brake (either wheel brakes or drive line brakes), the invented control system may be adapted for either the hydraulic application brake system or the mechanical parking brake. When adapted for the hydraulic application brake system, the invented management mechanism may be of two general types: 1) an air, hydraulic-oil, spring, or other actuator that causes the master cylinder to apply the brake; or 2) a pressure generator that is "inserted" between the master cylinder and the brake mechanism and that creates pressure in the brake fluid line to apply the brake. After either type of management system is installed in a hydraulic brake system, the adapted brake system then serves double duty as a "hydraulic parking brake" as well as a hydraulic application brake.

When adapted for the mechanical parking brake system, the invented management mechanism operatively connects to the mechanical brake linkage, such as a brake cable. The management mechanism may be, for example, apparatus for air-actuation, hydraulic-oil actuation, spring-actuation or electric-actuation of the mechanical brake linkage.

The various circuits, sensors, and switches included in the invented control system automatically 1) sense conditions, of one or more "stations" in or around the vehicle, that are potentially dangerous if the vehicle moves and 2) automatically signal the controller, which decides whether or not to "trip" the management mechanism to apply the brakes. Such "stations" may be vehicle components, such as the ignition system, the vehicle main door and/or an emergency door, a wheelchair lift, a dump truck bed, a delivery vehicle door, a trailer, a crane boom, outrigger, seat belts, a pressure-sensing operator's seat sensor, tire pressure sensor, engine oil pressure sensor, emissions sensor, air bag sensor, or other vehicle or engine diagnostic sensors that sense and signal the controller when conditions are outside of the normal operating range. Other "stations" may include equipment, objects, or location of people outside a vehicle, for example, that are positioned too near or moving too near to the vehicle in a street, parking lot, loading dock or warehouse. Other "stations" may include test units for driver condition or desirability, such as a breath analyzer, a voice analyzer, or an access-code key-pad, for example.

In general, signals from the various "stations" inside, outside, or around the vehicle to the controller are created by sensors or switches being actuated by the movement of, or the position of, equipment or people, and this actuation signaling the controller, for example, via sensor circuits or other electric or electronic means or other transmission. In some cases, actuation of the sensor or switch at a particular station comprises interruption, either the positive side or the negative/ground side, of the controller circuit including the particular sensor or switch. Various means of switching/sensing may be used, for example, conventional electrical contact, sound-switching, light-emitting-switching, magnetic-switching, fluid, pressure, radar, sonar, microwave, or any other conceivable switching or sensing. When a sensor or switch, or, alternatively, when a certain combination of sensors or switches, is actuated, and the controller decides that conditions are appropriate, the controller "trips" the management mechanism and the management mechanism applies the brakes. As long as the condition causing the "trip" persists, the brakes remain locked in the applied condition in most circumstances. For example, a switch may be operatively connected to a handicapped lift system, and the switch may be electrically/electronically connected to the invented controller, so that using the lift opens a circuit to the controller, which trips the management mechanism to apply and lock the brakes. Once the lift system is not is use, the driver may release the brake. Likewise, a switch may be operatively connected to a door, and the door switch may be electrically/electronically connected to the invented controller, so that opening the door breaks its sensor circuit and trips the management mechanism to apply and lock the brakes. Once the door is closed, the driver may release the brakes. For simplicity hereafter and in the claims, the term "sensor" may be used to indicate any sensor or switch at a "station" that is actuated by conditions at the station to signal the controller.

A feature of the preferred invented control system is that loss of power to the management mechanism causes it to apply and lock the brake. In the especially-preferred embodiments, any time that power is removed from the control module (the "controller"), power is also removed from the management mechanism and the brakes are applied. The positive power input for the preferred controller is activated by either direct or indirect operation of the ignition switch of the vehicle. Therefore, turning the vehicle ignition to the "OFF" position de-activates the controller and the management mechanism to apply the brakes.

The preferred brake control system also includes a sensor and logic for preventing automatic application of the brake if the vehicle is in motion above a certain speed. This feature of the invented control system may be adapted to interface and cooperate with various designs of speedometers, such as magnetic, electrical, or electronic sensor types, or other means for measuring vehicle motion or speed. For example, a conventional speedometer magnetic pick-up may be used to signal the controller for this purpose.

The preferred brake control system also includes features that improve operability in substantially all vehicles, specifically, a signal qualifying circuit and noise suppression functions. The preferred signal qualifying circuit detects the presence of a constant voltage maintained for a minimum duration of time, in order to verify that a signal to the controller is "real," that is, it is not a signal created by a jiggling of a switch, electric noise or other false signals. Alternatively, a qualifying circuit may also use other measurements, such as frequency, to verify true signals. The noise suppression functions may be affected by a combination of various transient suppression inductors, capacitors, diode and surge protectors.

The preferred brake control system includes a manual brake-releasing override system to override the controller's application of the brakes, during emergencies and/or at the driver's discretion. For example, if the invented controller applies and locks the brakes when the vehicle is still in traffic, the driver may use the manual brake-releasing override to release the brake for enough time to move the vehicle to the side of the road. The manual brake-releasing override may include, for example, the driver pushing with a finger on a portion of the spool (SP) of the air valve to temporarily allow air through to the spring to temporarily release the brake. Alternatively, the manual brake-releasing override may be assisted mechanically or electrically.

BRIEF DESCRIPTION OF THE DRAWINGS

FIG. 1 is a schematic diagram of one embodiment of the prior art showing an air parking brake system with the manual handle "pushed-in" to disengage the brake.

FIG. 2 is a schematic of the prior art embodiment of FIG. 1, showing the loading valve closed by the pulled-out manual handle, thereby applying the air parking brake.

In FIG. 3, the loading valve handle is pushed in, and the ignition switch is closed to energize the solenoid valve, whereby air is allowed to pass through both the solenoid valve and the loading valve to disengage the brake.

DESCRIPTION OF THE PREFERRED EMBODIMENTS

Figure 3:
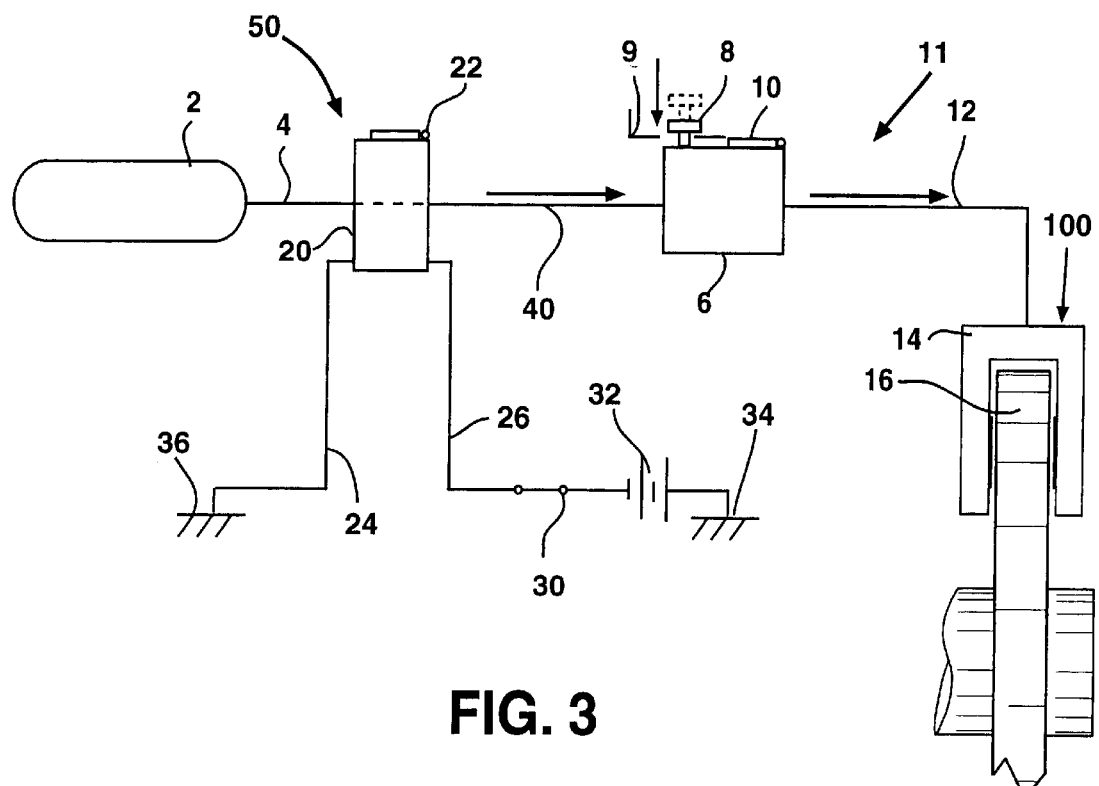
FIG. 3 is a schematic diagram of one simplified embodiment of the present invention, a retrofit solenoid valve connected to the vehicle ignition switch and inserted upstream of a conventional loading valve.
Figure 4:
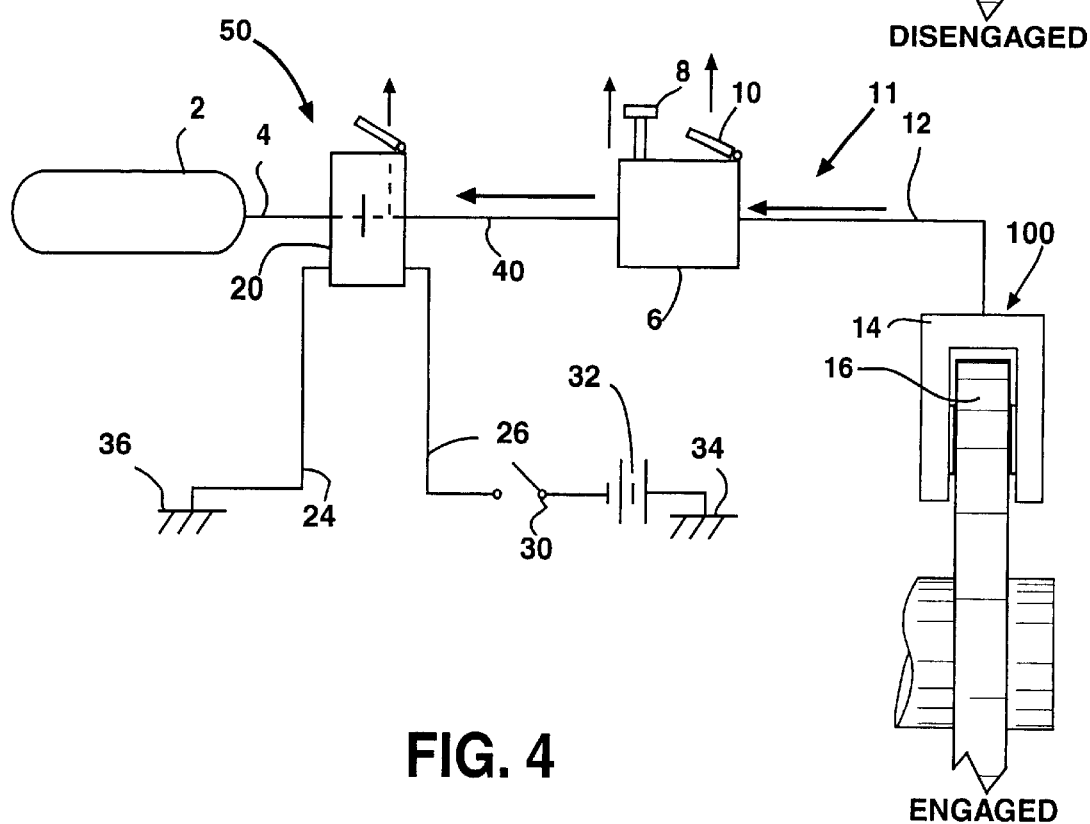
FIG. 4 is a schematic diagram of the simplified retrofit embodiment of FIG. 3, shown in a brake-applied condition.
Figure 5:
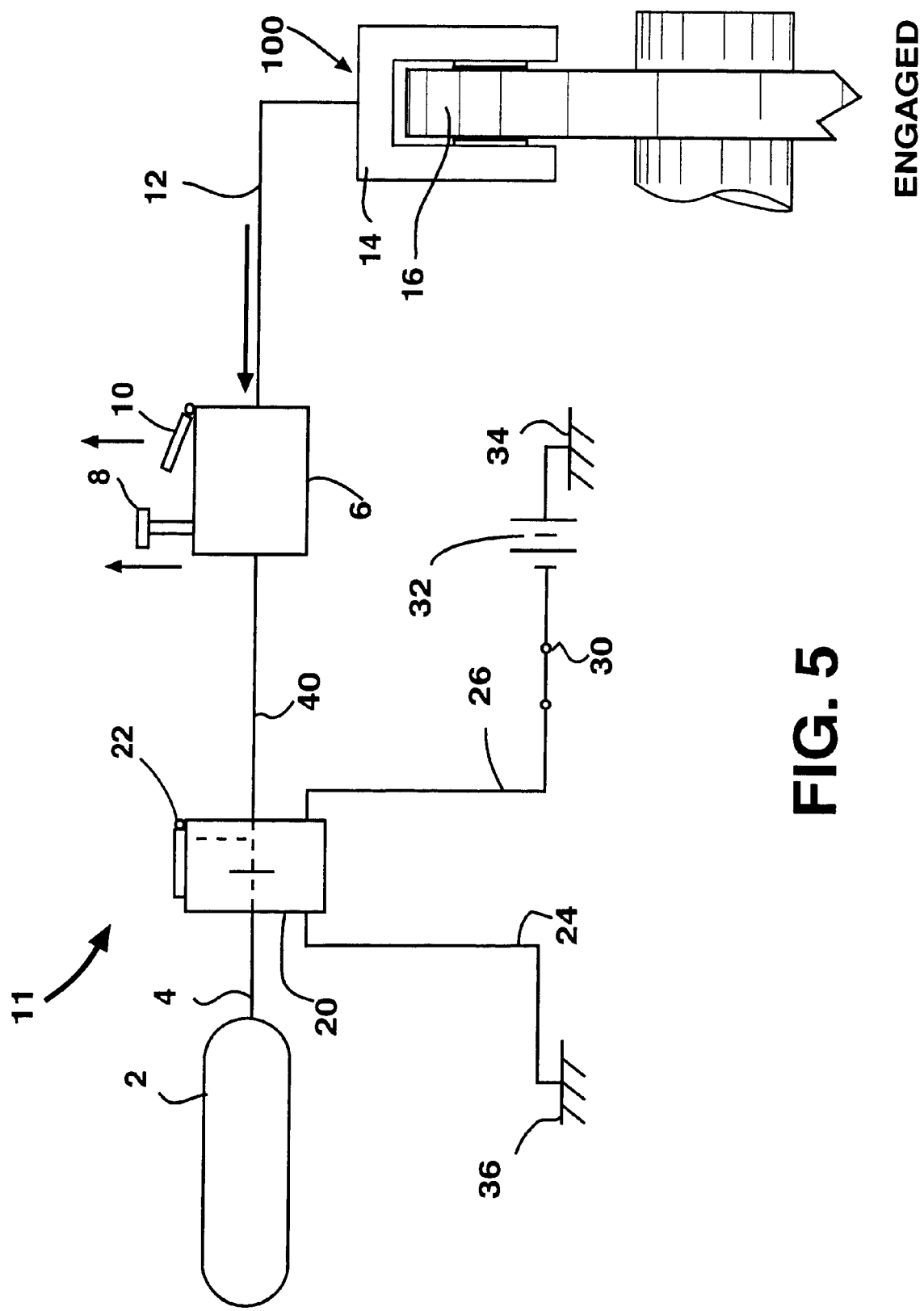
FIG. 5 is a schematic diagram of the simplified retrofit embodiment of FIGS. 3 and 4 showing normal operation of the conventional loading valve, wherein the ignition switch is "on" and the driver has closed the conventional loading valve to apply the parking brake.
Figure 6:
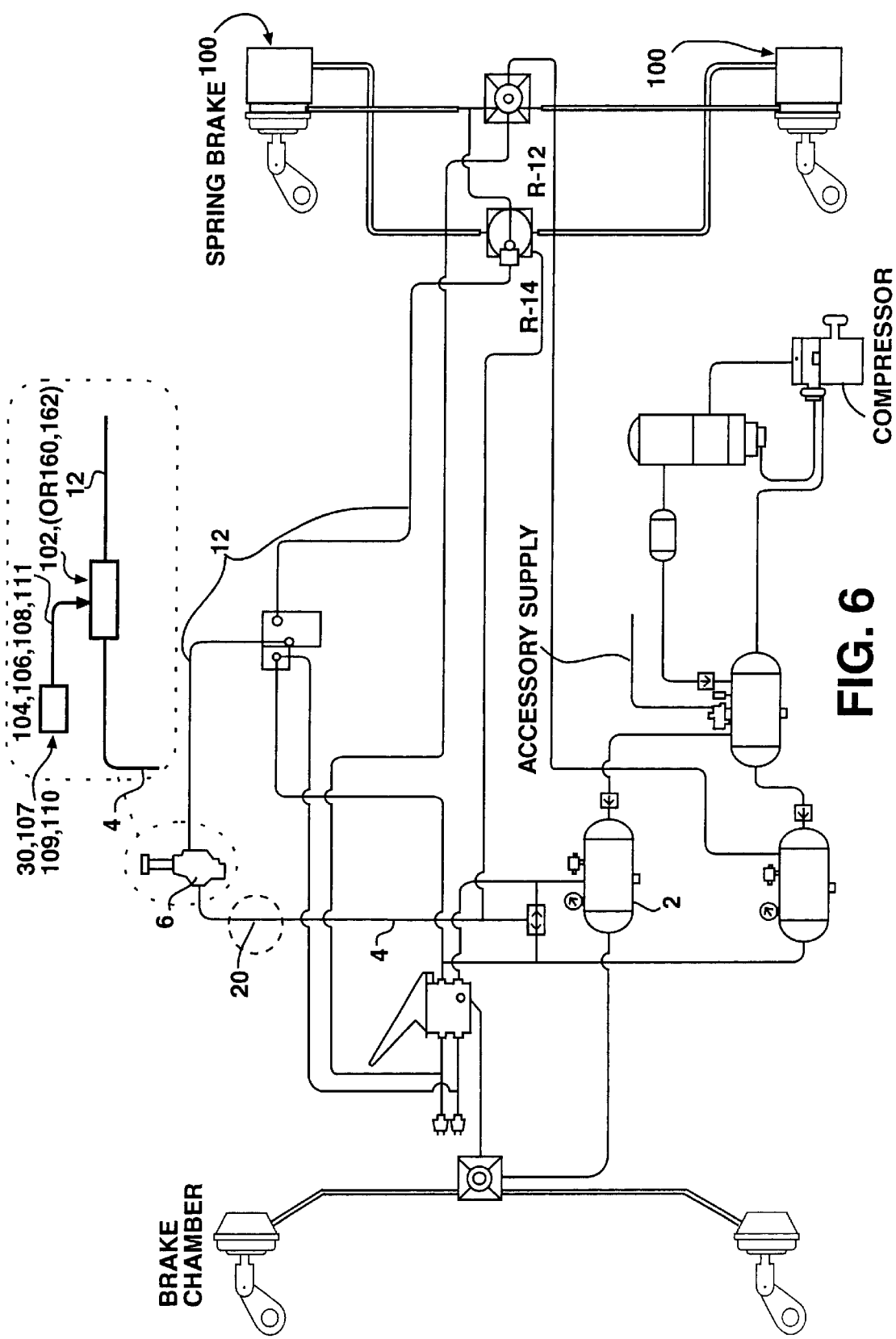
FIG. 6 illustrates one embodiment of a commercial vehicle brake system, indicating 1) the location for installation of the simplified retrofit embodiment of FIGS. 3, 4, and 5 in dashed lines and 2) the location, in dotted lines, for installation of the original equipment manufacture (OEM) embodiments of the invention, which feature technology that replaces the conventional loading valve.

Referring to the Figures, there are shown several, but not the only, embodiments of the invention. FIG. 1 and FIG. 2 depict one embodiment of the prior art, which is the air brake apparatus and methodology conventionally used for air parking brakes in commercial vehicles such as school buses. FIGS. 3–5 illustrates simplified retrofit embodiments of the invention, which place a vented solenoid-operated air valve in series with a conventional loading valve in an air parking brake line. FIG. 6 illustrates placement of 1) the simplified retrofit embodiments of FIG. 3–5 and also the placement of 2) the preferred (typically OEM) embodiments of the invention that replace the conventional loading valve with either a) the "electronic valve" of FIGS. 7–9 or b) the especially-preferred electronic brake control system of FIGS. 10–20. FIGS. 16–19 depict several embodiments of the especially-preferred automatic brake control system for vehicles with hydraulic brakes.

The especially-preferred brake control system using the electronic controller and described in FIGS. 10–20 adapts a conventional brake system, that is, either a conventional air parking brake system, a conventional hydraulic application brake system, or a conventional mechanical parking brake, to serve an additional role as a multi-use safety system. Preferably, the same electronic controller is used in all three types of brake control systems.

As suggested in the Related Art Section and the Summary Section of this Description, the automatic systems supplied by the invented brake control system are vital to safe operation of many vehicles, because of the busy, varied, and often stressful tasks that a vehicle operator must perform. The invented brake control system is generally constructed under the assumption that the vehicle should not move when the ignition is in the "OFF" position, when the driver is outside the vehicle, or when an individual is entering, exiting, or very near the vehicle, etc. Also, optional features of the invented control system may link parking brake operation to monitoring of the drivers identify or sobriety, or may provide for control of other equipment besides the brakes, such as the radio.

PRIOR ART AIR PARKING BRAKE SYSTEM

In the prior art in FIG. 1, an air source 2 such as an air reservoir or air compressor supplies air pressure to the air parking brake system. This air pressure is conventionally used for the vehicle's air parking brakes, as well as the vehicle's air brakes in general. This air pressure is then routed through a supply air hose 4 to a loading valve 6. A delivery air hose 12 routes the air pressure from the loading valve 6 to the air parking brake mechanism 100. The loading valve 6 has an attached valve handle 8 which is mounted on the dash of the vehicle. When the valve handle 8 is "pushed" by the vehicle's operator into an inner position, the loading valve 6 is open. When the loading valve 6 is open, as in FIG. 1, air is allowed to pass through the supply air hose 4, through the open loading valve 6, through the delivery air hose 12, and into the air parking brake mechanism 100. Air pressure thus supplied to the air parking brake mechanism 100 overcomes the brake spring tension which holds the air parking brake pads 14 against the brake drum 16, thereby inhibiting movement of the vehicle's wheel(s). This release of the brake spring tension disengages the air parking brake mechanism 100 and allows for free movement of the vehicle's wheel(s).

In the prior art, when the valve handle 8 is "pulled" by the vehicle's operator into an outer position, the loading valve 6 is closed. When the loading valve 6 is closed, as in FIG. 2, the air source 2 is cut off and air pressure in the delivery air hose 12 and the air parking brake mechanism 100 is vented through an exhaust vent 10 located on the loading valve 6. This release of air pressure from the air parking brake mechanism 100 allows the brake springs located within the air parking brake mechanism 100 to retract. This forces the air parking brake pads 14 to press against the brake drum 16, thereby applying the air parking brake mechanism 100 and inhibiting movement of the vehicle's wheel(s).

SIMPLIFIED, RETROFIT SOLENOID VALVE COOPERATING WITH PRE-EXISTING AIR PARKING BRAKE LOADING VALVE

A simplified retrofit embodiment of the invented automatic air parking brake system 11, in FIGS. 3–5, features a vented solenoid valve that is added to a conventional air brake system, as a supplement to the conventional loading valve. This simplified retrofit unit does not include an electronic control module but is wired to the ignition switch of the vehicle. When the ignition key switch is turned to "OFF," the solenoid valve is de-energized, which closes the solenoid valve and vents the down-stream air line. In the parking brake system 11 of FIGS. 3–5, an air source 2, such as an air reservoir or air compressor, supplies air pressure. The air is routed from the air source 2 through a supply air hose 4 to a solenoid valve 20. A middle air hose 40 connects the solenoid valve 20 to a loading valve 6. The loading valve is then connected to the air parking brake mechanism 100 through the use of a delivery air hose 12. The solenoid valve 20 is electrically grounded through the use of a ground wire 24 in contact with a ground screw 36. The solenoid valve 20 is electrically connected to the vehicle's ignition key switch 30 through the use of a connection wire 26. When the vehicle's ignition key switch 30 is closed or "ON", then the solenoid valve 20 is energized, which means it is "open" to allow air to flow through the valve. When the vehicle's ignition key switch 30 is open or "OFF", then the solenoid valve 20 is de-energized, "closing" and venting the solenoid valve 20. The vehicle's ignition key switch 30 is ultimately connected to the vehicle's battery 32, which itself is grounded 34.

FIG. 3 shows automatic air parking brake system 11 during normal driving with the parking brake off. The ignition key switch 30 is "ON", energizing and opening the solenoid valve 20. The manual parking brake handle 8 is pushed into an inner position on the dashboard 9, so that the loading valve is open. When in this configuration, air pressure is allowed to travel from the air source 2, through the supply air hose 4, through the open solenoid valve 20, through the middle air hose 40, through the open loading valve 6, through the delivery air hose 12, and to the air parking brake mechanism 100. Within the air parking brake mechanism, this air pressure overcomes the brake spring tension biasing the air parking brake pads 14 towards the brake drum 16. Thus, moving the pads 14 away from the brake drum 16 results in "disengagement" of the air parking brake, thereby allowing for free movement of the vehicle's wheel(s).

FIG. 4 shows automatic air parking brake system 11 when the vehicle's ignition key switch 30 is open or "OFF", thereby de-energizing and closing the solenoid valve 20. When in this configuration, air pressure within the solenoid valve 20 and within the middle air hose 40 is vented through the solenoid valve exhaust vent 22. Air pressure within the loading valve 6, within the delivery air hose 12, and within the air parking brake mechanism 100 is vented through the loading valve exhaust vent 10 of the closed loading valve 6. This release of air pressure allows the brake mechanism 100 to "engage", that is, allowing the brake springs 15 to retract, thereby bringing and holding the brake pads 14 into contact with the brake drum 16 and inhibiting movement of the vehicle's wheel(s).

In FIG. 4, the manual handle 8 is shown in the "pulled" position, and the loading valve is closed. This loading valve position may result from either of two cases. If the vehicle operator pulls the handle 8 before turning off the ignition switch, the loading valve closes and vents. Or, if the ignition switch is turned off first, the solenoid valve 20 lowers the pressure directly upstream (in middle hose 40) of the loading valve, and this lowering of pressure automatically "pops" or closes the loading valve. This is due to the loading valve being designed to be fail-safe by releasing pressure on the brake springs and thereby applying the parking brake in the event of an air source failure. Depending on the particular design, the loading valves are designed to automatically close when upstream pressure drops below about 60 psi, for example.

FIG. 5 shows automatic air parking brake system 11 when the vehicle's ignition key switch 30 is closed or "on", so that the engine is running, but the parking brake is applied. The solenoid valve 20 is energized and open, pressurizing middle hose 40. The loading valve is closed, with the handle 8 in the "pulled" position. When in this configuration, air pressure within the loading valve 6, within the delivery air hose 12 and within the air parking brake mechanism 100 is vented through the loading valve exhaust vent 10. This release of air pressure applies the brake mechanism 100. In FIG. 5, the position of the loading valve may be for two reasons, both of which result in the safe condition of brake engagement. First, FIG. 5 may represent the situation in which the vehicle has been restarted after being parked and turned off, and the engaged parking brake has not yet been released by pushing in the handle 8. Also, FIG. 5 may represent the situation in which the operator is parked and idling the engine, but has purposely applied the parking brake by pulling out the handle 8. In either case, if the operator turns off the ignition switch, the actuator system will go into the mode shown in FIG. 4, in which the solenoid valve 20 maintains a low pressure upstream of the loading valve and maintains it in a closed position.

Embodiments such as shown in FIGS. 3–5 are well adapted to be retrofit into the air brake system of an existing commercial vehicle, for example, those which have a brake diagram similar to that shown in FIG. 6. The location for retrofit of the solenoid valve 20 into the conventional parking brake system is marked in FIG. 6 with dashed lines. Such a system 11 does not disrupt or lower the integrity of the main (driving) brake system, as it is installed in lines separate from the main system.

"ELECTRONIC SOLENOID VALVE" REPLACING CONVENTIONAL LOADING VALVE AND CONNECTED TO A PLURALITY OF STATIONS

Figure 7:
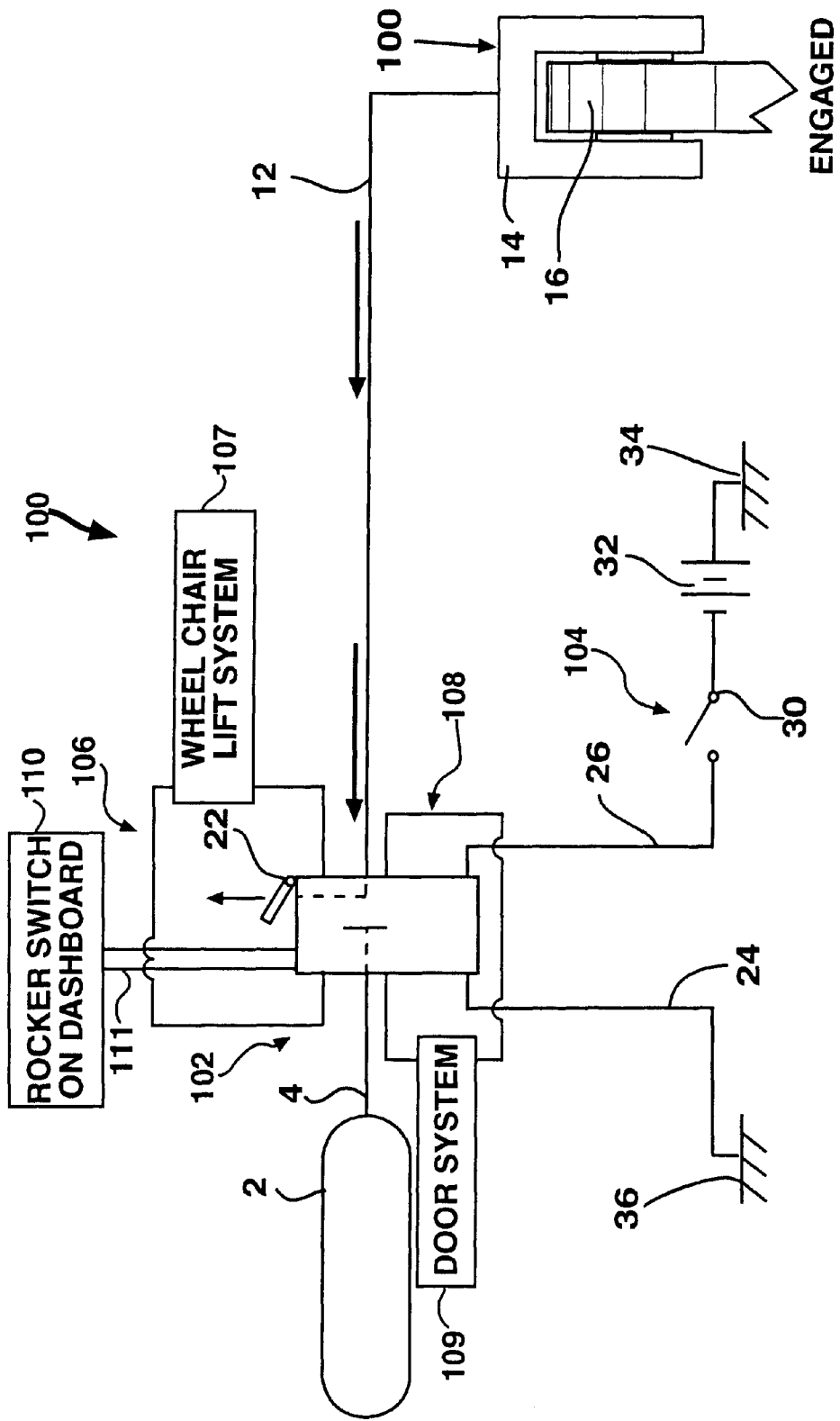
FIG. 7 is a schematic diagram illustrating one OEM embodiment of the invention, called an "electronic valve," which replaces a conventional loading valve and is electronically connected to a plurality of stations on/around the vehicle.
Figure 8:
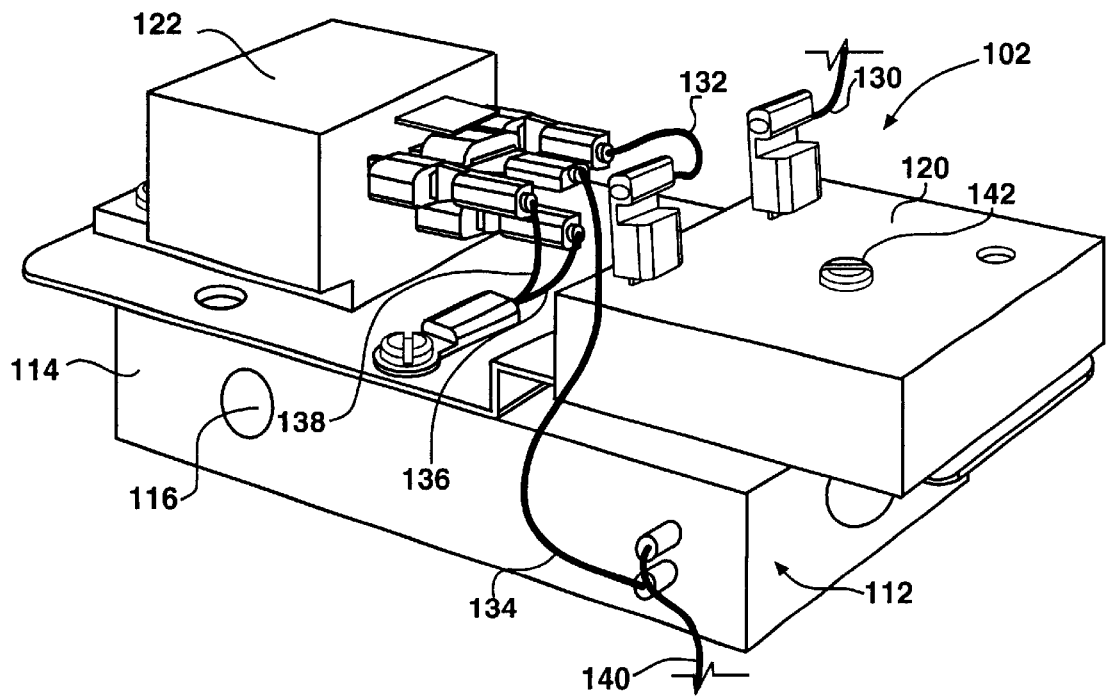
FIG. 8 is a perspective view of the electronic valve unit of FIG. 7, for installation in a vehicle wherein the door switch is on the positive side of the circuitry.
Figure 9:
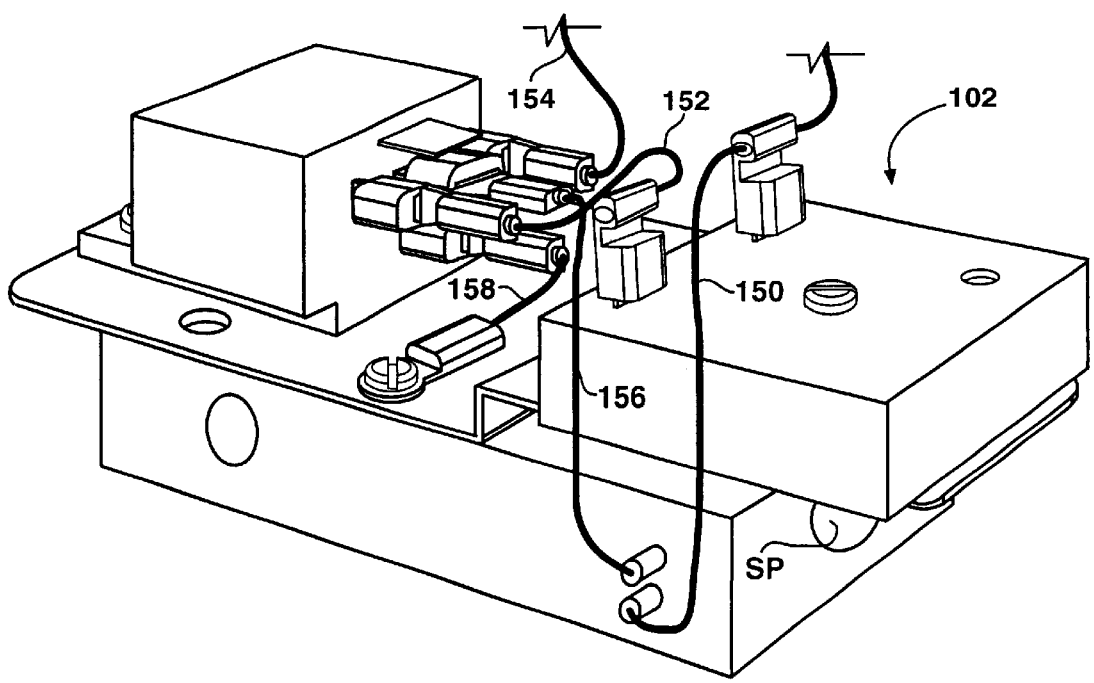
FIG. 9 is a perspective view of an alternative embodiment of the electronic valve unit of FIG. 7 for installation in a vehicle wherein the door switch in on the negative side of the circuitry.

An embodiment of the invention is shown in FIGS. 7–9, which comprises what the inventors call an "electronic solenoid valve" in place of, rather than in series with, the conventional aid loading valve. The electronic solenoid valve is operatively connected to a plurality of stations in/around the vehicle, including the ignition switch, to prevent movement of the vehicle during potentially unsafe conditions. This system 100 includes an electronic solenoid valve unit 102 that includes both air blocking and air venting functions, and that includes control electronics operatively linked via various circuits to the plurality of stations in/around the vehicle. Preferably, as represented schematically in FIG. 7, the various circuits include a circuit 104 that cooperates with the ignition switch 30 generally as described above for system 11, 11', a circuit 106 that cooperates with the wheelchair lift 107 so that the parking brakes will automatically be engaged when the lift is used, and a circuit 108 that cooperates with the passenger and/or driver door 109 so that the parking brakes will automatically be engaged when the door or any of a plurality of doors opens. The door switch for this station circuit is located at or near the door, and is preferably the same switch that is conventionally installed on the door for connection to the dome light. In the case of the wheel chair lift, a circuit is routed between the unit 102 and the lift, with a switch located at an appropriate position in/near the lift equipment to sense the lift being in any but its stowed, unused position.

Preferably, system 100 also includes operator switch 110, such as an on/off rocker switch or other switch, mounted on the dashboard or other convenient control center location in/on the vehicle, which allows the driver to manually set the parking brake to a "park" position and to manually release the parking brake to a "drive" position, once safe conditions resume. Such a switch 110 replaces the conventional manual push/pull handle in the vehicle cab, and may include lighting or flashing options to remind the driver of the status of the electronic solenoid valve, for example, that the brake is set.

FIG. 8 illustrates one embodiment of the electronic solenoid valve unit 102. The unit 102 includes a solenoid valve 112 with an air line blocking valve function and a venting function. The blocking valve function is closed and the venting function is open when the circuits to the ignition and each station are completed. The unit 102 includes a body 114 with an air inlet port (on hidden side of body 114 in FIG. 8), an air outlet port 116, a vent port (on hidden side of body 114 in FIG. 8) and internal passages cooperating with the solenoid-actuated internal valving. The electronics of the this electronic solenoid valve unit 102 include a timer 120 and a relay 122 electronically communicating with solenoid valve 112. Wires are shown schematically on FIG. 8, as follows, for a unit 102 installed in a bus wherein the door switch is on the positive side of the circuitry: 130 wire from door switch; 132 wire from timer to relay; 134 wire from relay to solenoid ground; 136 wire to ground; 138 wire to ground; and 140 wire from ignition switch.

In this FIG. 8 embodiment, the timer may be preset by means of an adjustor 142 with a delay time, so that, once the door is opened and remains open more that the present delay time, a signal is sent to the relay and, hence, to the solenoid so that the solenoid blocks the air supply and vents air pressure from the line to the brake. Such a timer system may be used to prevent unwanted setting of the brakes when a "false" signal is received from one of the stations, for example, when the door is opened only for a few seconds, or when the door switch bounced "open" for a fraction of a second. The predetermined delay time is set, preferably at the factory, as an amount of time the door must remain open before the unit acts to apply the brakes. This delay time is typically set in the range of 0.5–10 seconds, but may be set at zero time or at higher amount of time. Most preferably at 4–5 seconds for city busses and 0.5–1 seconds for school buses, so that a quick opening and closing of the door does not trigger the system.

In FIG. 9, the solenoid unit 102 comprises the same elements as the unit 102 of FIG. 8, except that it is wired to cooperate with bus wiring in which the door is on the negative side of the circuitry. This schematically-shown wiring may be described as follows: 150 wire from ignition to timer and to solenoid; 152 exciter wire from timer to relay; 154 door switch wire; 156 ground wire from solenoid to relay; and 158 ground wire. The embodiment of FIG. 9 operates generally the same as the embodiment of FIG. 8, except, as may be understood by one skilled in the art, the wiring is altered dependent on the wiring of the vehicle into which it is installed.

Figure 10:
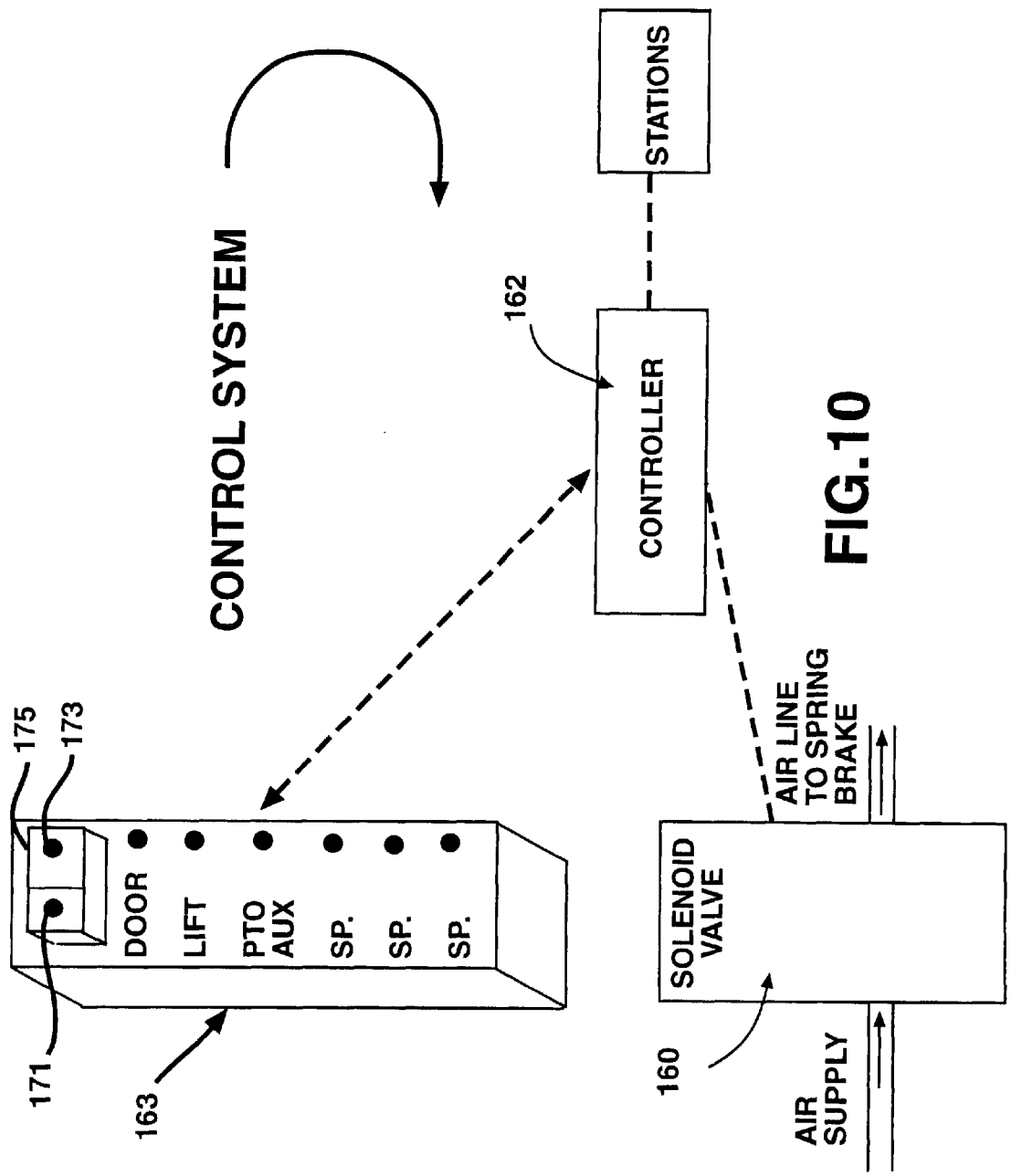
FIG. 10 is a schematic view of an especially-preferred OEM embodiment of an invented solid-state controller system for air parking brakes, which is electrically/electronically connected to a plurality of stations in/on/around the vehicle.

Thus, with the embodiments of FIGS. 8 and 9, there must be at least two conditions met to allow the "electronic solenoid valve" to supply air to the brakes, that is, the ignition must be "on" and the door must be closed. FIG. 10 is a schematic diagram of a commercial vehicle brake system, indicating the location for installation of the embodiment of FIGS. 7–9.

Additional features may be included to match the electronic solenoid valve unit of FIGS. 7–9 to an individual vehicle's wiring design. In order to prevent an accidental engagement of the parking brakes when the driver or other party turns on the dome light, which is normally connected to the door switch to turn the dome light on when the door opens, the units of FIG. 8 and 9 should be used with a diode installed in the line between the dome light and the door switch. This way, the system is wired so that turning on the vehicle dome light does not trip the unit 102 in the same way that opening the door does. An air pressure failsafe system is preferably also included in the invented electronic solenoid valve system for each vehicle or trailer. When air supply pressure drops below 35 psi for any reason, the unit 102 trips to the brake-engaged position. This way, if the air supply is disrupted due to damage or malfunction, the brakes go to the safest condition.

Preferably, an analogous electronic solenoid valve system may be used according to the invention for an air parking brake system for the trailer of a tractor-trailer vehicle, or for air parking brakes in any vehicle or equipment. In such a system, an electronic solenoid valve unit, such as described above, is installed as preferably the sole blocking and vent valve in the trailer parking brake air line. The electronic solenoid valve unit is electronically connected to the tractor (truck) ignition switch, so that the trailer parking brake engaged and is locked in the engaged condition when the tractor engine is turned off. Also, the solenoid valve unit is electronically connected to a second switch in the tractor cab that allows the driver to manually set the trailer parking brake to a "park" position and to manually release the trailer parking brake to a "drive" position either after he/she has set the brake or after the electronic solenoid valve unit has tripped the brake into engagement. Optionally, the trailer parking brake electronic solenoid valve unit may include circuits and electronics that operatively connect to other stations on the trailer or even on the tractor. For example, a circuit may be included to the back door of a cargo van, so that the parking brake is applied and locked whenever the van door is open. Preferably, the operator switch for the trailer solenoid valve unit is separate but side-by-side on the dash board with the tractor parking brake operator switch.

ESPECIALLY-PREFERRED, SOLID-STATE BRAKE CONTROL SYSTEMS

Solid-state brake control systems are especially preferred embodiments of the invention, as they may include many safety features and many data ports for sensing conditions at various stations in and around the vehicle. An example of a solid-state brake control system, according to the invention, includes a solenoid valve, a solid-state controller, and an operator control switch mounted in a chosen convenient position. These three main components are operatively and electrically/electronically connected to perform the required and desired methods of applying and locking a parking brake. Preferably, the invented control system should be compliant with all required Federal Motor Vehicle Safety Standards and compatible with the existing brake and ABS brake systems. One solid-state brake control system is described below:

Given the description and drawings contained herein, one skilled in the art may see how a brake control system including a solenoid valve unit 160 with a solid-state electronic controller 162 (FIG. 10) may have advantages over the unit 102 (shown in FIGS. 8 and 9). The controller 162 is designed to receive and process the signals from a plurality of sensors/switches at the various stations, and, appropriate, to signal the management systems that manage either air, brake fluid, hydraulic fluid, mechanical, or electric devices to cause application of the brakes. For example, in air parking brake applications, the management mechanism is a solenoid valve that closes and vents; in hydraulic brake applications, the management mechanism is the pressure generator and associated valving that is inserted between the master cylinder and the brake mechanism, or an actuator that causes the master cylinder to create pressure; or, in a mechanical brake application, the management mechanism is an air, hydraulic, spring, or other unit that connects to and operates the mechanical linkage to the brake mechanism.

The controller 162 is operatively, and preferably also physically, attached to the management mechanism. Alternatively, the controller 162, solenoid 160, and operator switch 163 may be separate structures electrically/electronically connected.

The controller 162 may be a printed circuit board, which may include some imbedded microprocessor chip(s), or may be a substantially microprocessor design. The printed circuit board and/or microprocessors may be manufactured according to conventional circuit board and/or chip manufacturing techniques once the invented apparatus, circuits, and methods described and drawn herein are understood. Optionally, the controller may include memory to record the control events that take place over time, for example, to create a safety record or operator driving performance record.

Figure 14:
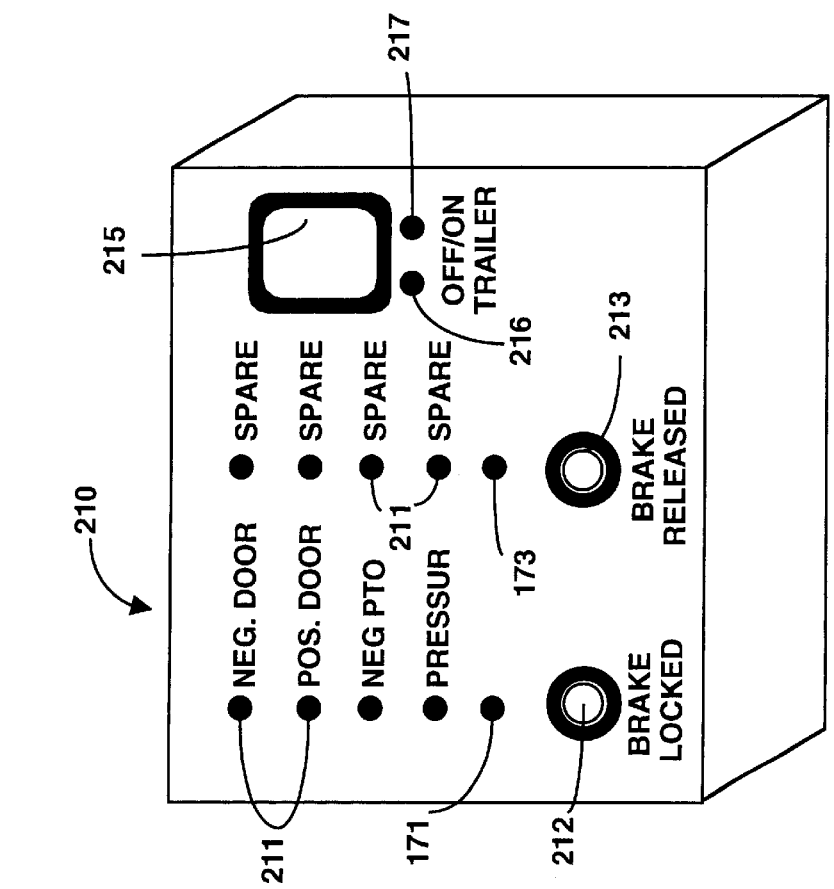
FIG. 14 is a perspective view of another embodiment of an operator switch for use in a solid-state embodiment of the invention, which includes a trailer switch and indicator and a plurality of indicators for signaling the status of the various stations around/in the vehicle.
Figure 13:
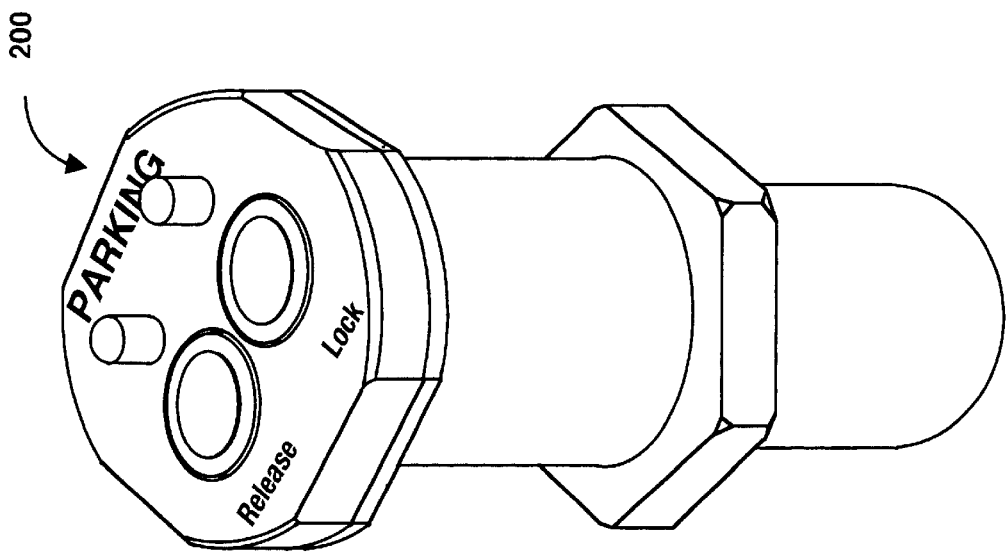
FIG. 13 is a perspective side view of one embodiment of an operator switch for use in a solid-state embodiment of the invention, in which the switch is made to fit into the space provided for a conventional manual air parking brake handle.

Preferably, the operator switch includes manual switch buttons that are referred to herein and in the drawings as either "actuate" and "deactuate" switches or buttons, or "brake locked" and "brake released" switches or button. Preferably, the operator switch also includes indicator lights and labels for each station, indicating which station is causing the engagement of the brakes. See, for example, the operator switches of FIGS. 13 and 14. FIG. 13 illustrates an operator switch which replaces the conventional manual brake knob that operators have used for so long. FIG. 14 illustrates a more complete operator switch, of the type that may include, for example, rows of LED lights labeled "Door," "Lift," "PTO/Aux," "Spare," etc, positioned near the "activate/deactivate" switch, which is discussed below, and an optional trailer brake control and indicator lights. Optionally, liquid crystal, TV, or monitor technology may be used to provide text, symbolic, or other indicia or visual representations to educate the driver or other observer about the existing conditions.

Figure 15:
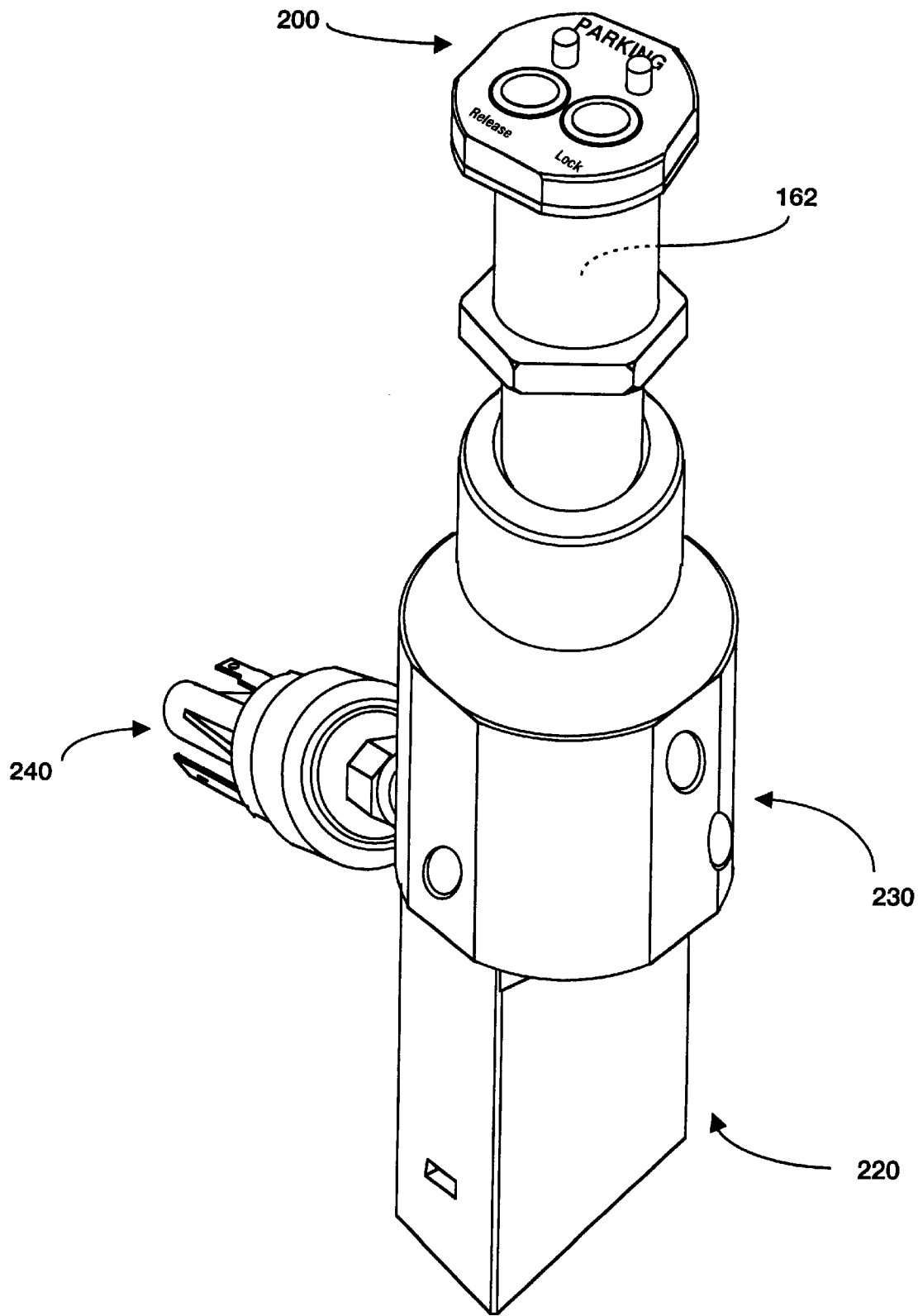
FIG. 15 is a perspective view of an one embodiment according to the invention of a combined controller, operator switch, solenoid-controlled air valve, and low air pressure switch.

Optionally, the controller 162 may be placed inside the operator switch body, providing a compact combination controller-switch-valve unit as is illustrated in FIG. 15. The combined unit shown in FIG. 15 includes operator switch 200 which encloses a microprocessor controller 162 inside its body. The switch 200 operatively connects to a solenoid-controlled air valve (solenoid portion 220 and air valving portion 230). A low pressure switch 240 is shown attached to the side of the air valving portion 230.

Preferably included in the solid-state embodiment are the following features, described for an air parking brake embodiment:

SOLENOID OPERATION

1. The solenoid employed in this design places the vehicle air-disengaged/spring-engaged parking brakes in the applied position whenever the solenoid is not energized, that is, when current is not passing through the solenoid coil from the control unit.
2. The controller is designed so that, upon the vehicle ignition being turned on, the controller automatically powers up in a state in which the brakes are locked. Thus, the system does not require any manual application of the brakes by the operator when the vehicle is first started. A red indicator light 171 shows that the brake is applied when the vehicle starts up.
3. Releasing the brake may be done by momentarily placing the "activate/deactivate" momentary switch 175, which may be located on the combined switch/display box 163, in the activate position. This causes the electronic control circuit to latch DC ground to one side of the air brake control solenoid. The other side of the solenoid is electrically wired to the +12 DC side of the vehicle's electrical system. It may be noted that alternative embodiments may be adapted to other than a 12 volt system.
4. Manual or other release of the brake may not be done, and the red indicator will continue to flash, if the vehicle's supply air pressure is less than a predetermined set point pressure. (See Low Pressure Detection, below).
5. This latching energizes the solenoid and releases the brakes. This action is indicated by the controller turning off the red indicator light and turning on a green indicator light 173. This latching action releases the vehicle parking brakes for normal usage.
6. As long as the solenoid remains latched, the brakes will remain in their normal operating state. This condition will remain this way until the controller is electronically or manually reset (de-energized) in one of the following manners:
   a. Manually placing the "activate/deactivate" switch into the "deactivate" position; in this case, deactivation takes place nearly instantly. This places +12 v on a controller connector input pin that instantly resets the control circuit and de-energizes the solenoid. This function is not over-ridden by the speedometer input function; it is active whether or not the vehicle is stopped or in motion. In other words, the operator can manually apply the brakes whether or not the vehicle is in motion, giving the operator control in an emergency.
   b. If the low air pressure switch closes.
   c. If a door switch, that has its contacts normally open, closes (because the door is opened). This control input is only active when the vehicle is not in motion.
   d. Optionally, if any other stations to which a particular controller is operatively connected signal the controller that a condition exists that warrants application of the brakes. For example, such stations as a "PTO/aux." (power take off/auxiliary) switch, a wheelchair lift switch, or other described elsewhere in this Description.

Preferably, in the case of the above operations, the controller is designed so that the signals of any of these sensors/ switches must remain non-interrupted for approximately 0.5 to 1.25 seconds to validate their operation before the controller applies the brakes. Once the brakes are applied because of these signals, the brakes remain applied in the locked state until the potentially unsafe condition has been eliminated and the brakes are then released by the driver releasing the brakes with his/her manual control switch. If the potentially unsafe condition has not been eliminated, the driver, in an emergency, the driver may manually release the brake by using the manual brake-releasing override for a short period of time to move the vehicle to safety.

More specifically, in the especially-preferred control system:

LOW PRESSURE DETECTION

The especially-preferred controller is set up to detect the opening of a normally closed pressure switch. This pressure switch, set to open when the air pressure falls below the pressure set point (typically approximately 35 pounds per square inch) is placed in series with the control system solenoid coil. Thus, it may be seen that preferably only the electronic controller and the pressure switch control the flow of electrical current to the solenoid. When the air pressure falls below approximately 35 psi, and this pressure switch opens, current is broken to the control solenoid and this action applies the air brakes in the locked position. The controller senses this and responds by resetting all of its control latches such that the brakes can not be released until the air pressure is restored to over 35 psi.

Likewise, the controller also senses whether or not this air pressure sensor is open or closed when the vehicle is first started. If the air pressure is below 35 psi on start up, the controller unit will not allow any type of brake release, including the operators manual release switch, until 35 psi air pressure exists.

INITIAL POWER UP

Specifically, upon application of the vehicle DC power to the preferred controller, the following functions take place, regardless of the state of any of the sensor inputs to the controller.

(1) Capacitors begin charging throughout the entire controller, two of which are specifically placed in series with Resistors to perform these two initial functions:
   (a) Power On Reset pulse to initiate the start up latches in their reset mode the solenoid latch circuit;
   (b) A pulse that sets the second latch to reinforce the cutoff state of the first latch.
(2) As a result of the action of the two above noted pulses, the system is automatically forced into the "Brakes Locked" state. The only means of releasing it from this state is with the operator manual brake-releasing override but that too is conditional to operating air pressure being above a set minimum value. The controller responds as follows:
   (a) If the air pressure is below 35 lb. per square inch, all air brake solenoid release functions are blocked by the control unit. Furthermore, when the air pressure is below this 35 psi, a set of contacts, wired in series with the power leads to the air brake solenoid, are in the open position, further preventing current flow in the solenoid. This state will remain in effect until such time as the air pressure has exceeded the 35 psi minimum and has closed the pressure switch that is in series with the power lead going to the solenoid.

The operator of the vehicle is alerted to this low pressure condition by the flashing state of the red light emitting diode lamp located in the operator's switch and indicator housing. This indicator lamp remains in flashing mode, of approximately 4 Hertz and approximately a 50% on/off duty cycle, as long as the air pressure is less than 35 psi. Once the air pressure is up to correct level, the lamp ceases to flash and switches to a steady ON state, notifying the operator that they can now release the air brakes.

(b) If the air pressure is above the 35 psi minimum after initial power up of the controller, the red LED indicator lamp will initially turn on in the steady state, notifying the operator that working air pressure exists in the air brake system. The system will now permit release of the air brakes, but only by the operator release switch When the operator depresses and releases his manual release switch, the two latches, that are used to initially place the brakes in the locked position on power up, are then set in the "brakes released mode", and power is supplied to the air brake control solenoid by a translator switch within the controller.

In general, the air brake solenoid allows the brakes to be released only when power is applied to it. Any event that results in interruption of the current path to or from the solenoid will result in the brakes being locked.

SENSORS OPERATIONS

The especially-preferred controller makes use of two different types of sensor input lines.

(1) Six input lines that are active when connected to vehicle negative ground side of its electrical system;
(2) Two dedicated function (passenger door) sensors, one that is active when connected to the positive side of the electrical system, the other active when connected to the negative side of the vehicle electrical system. These two inputs are unique from the other six input lines in that, upon their release from their respective active sides, they cause the air brake to automatically release, whereas all the others require that the operator depress and release the manual release switch.

The system is not limited to these six negatively active inputs or just the one positively active door input. An infinite number of additional lines of the same type may be connected to either or all of them, provided caution is exercised to prevent dead short current loops on negative inputs and that one uses input codes on the positive door input to isolate the positive inputs form one another.

SENSOR SIGNAL VALIDATION CIRCUIT

To provide a measure of protection against false setting of the brakes caused by noise, a "loose" switch, a defective switch, and etc., a circuit has been included in the controller that requires that a sensor signal be present, without interruption, for between 0.5 seconds to 1.25 second before it will recognize it a valid signal and latch the brakes.

This delay time is common to all sensor inputs except the low pressure sensor, which is instantaneous and can only exist when the pressure switch has indeed opened from lack of pressure.

VEHICLE MOTION DETECTION

The especially-preferred control system contains circuits that detect, amplify, and then validate signals electrical signals that are generated by various means when the vehicle is moving.

Once the system has validated the input signal, a "override" signal is generated by the motion detection circuits and is routed to the sensor validate circuit, which blocks any of the other sensor from applying and locking the brakes. Once this motion over-ride signal is present, the only means of over-riding its lock out of setting the brakes is the use of the operators manual release switch, or of course, the vehicle coming to a halt.

There are two validation circuits used in this section of the controller unit. First, the signal must be present, uninterrupted, for approximately 1 to 2 seconds before it qualifies as a legitimate signal. This limits the possibility of the brakes being set by short duration noise picked up from the vehicle.

In addition to this 1 to 2 seconds validation time, the signal must be of sufficient amplitude to cause the circuits non-inverting amplifier to rise above a trip point that is adjusted to be slightly above vehicle ground potential.

An example of an electrical signal that may be generated when the vehicle is moving is a magnetic pulse generator that may drive a vehicle's electrically operated speedometer. In such an embodiment, the controller senses the output of the transmission pulse generator when the vehicle is in motion, without causing error in the vehicle speedometer. Preferably, this vehicle-motion monitoring system is designed to sense the rotational speed of the transmission output shaft, and any rotation greater than a desired value overrides the application of the brakes except when the brakes are applied by the manual operator's "activate/deactivate" switch. The vehicle-motion monitoring system is preferably compatible with either non-grounded or grounded speedometer systems. An option for some vehicles is to provide a four-wire motion detection sensor, as opposed to a two-wire sensor, for the speedometer pickup circuitry. This four-wire option may assure greater accuracy of the speedometer and, therefore, the motion over-ride system of the invention.

Other signals from the vehicle may be used for signaling the controller that the vehicle is in motion. For example, the controller may be adapted to respond to Hall Effect, optical, infrared, or other signals that are generated by and sent to the speedometer via a vehicle's primary computer system.

POWER SUPPLY AND INPUT LINE NOISE SUPPRESSION AND PROTECTION

The input power to the unit from the vehicle +12 vdc electrical system is passed through both a common mode inductive/capacitive filter, as well as transient protection devices limiting the input voltage spikes to 18 volts maximum.

The controller logic section is somewhat electrically isolated from the power required to run the brake solenoid valve by the use of an isolation diode. This is further supported by a number of various values of electrolytic capacitors connected between the +12 v reference voltage and ground at strategic points in the circuits.

The integrated circuit input lines from the off-board sensors have both diode and resistive protection in accordance to manufactures recommendations for them. This same protection scheme is also employed on the input lines from the operators manual control switches.

Thus, the controller is designed to suppress and/or eliminate momentary voltage excursions, both within and exceeding the normal positive and negative limits of the primary operating power source, that can cause damage and/or improper operation of any electronics circuits attached to the primary operating system.

MANUAL CONTROL FUNCTIONS

The manual control assembly contains two color coded push button switches and two correspondingly colored light omitting diodes (LEDs) which provide the operator a visual indication of what state the air brakes are in, preferably, green for released and red for locked.

The two switches, when active, place +12 v Ref (the working protected voltage for the controller, not raw vehicle +12 v) on the inputs to the two latches that either release or lock the brakes. Both the release and the lock inputs have an 11 ms validation time to prevent short duration positive noise spikes from releasing the brakes.

AUTOMATIC AUDIO DEVICE CUT-OFF

The controller optionally provides logic and output line to operate an exterior relay that may cut power to any sound-producing equipment whose power source is routed through it. This radio-cutting feature is restricted to the two different polarity door sensor input lines as this function is demanded only when the passenger entry-exit door is opened, for example, for listening for trains or traffic.

The controller contains provision on the negative and the positive door sensor circuits to power both an external optional relay and a corresponding indicator LED. When this option is used, activation of this relay by either of these two sensor input lines will break operating power to any audio device that is connected through it to vehicle +12 v.

Physical Size

The size of the solenoid, operator switch, and solid-state controller preferably are each less than 10"×5"×5", and may be any size needed for a particular vehicle. Optionally, the controller may be made small enough, by microprocessor technology, to fit inside the operator switch.

ABS Compatibility

The solid-state control system includes a two-way check valve between the air supply and the solenoid valve, for compliance with ABS requirements resulting from the use of a primary air source and a secondary air source. The check valve, or "shuttle valve," may be included in the invented control system, for replacement of the loading valve in vehicles in which the conventional air loading valve was designed in the past to include the check valve. For vehicles in which the check valve remains as apparatus separate from the conventional air loading valve, then removal of the loading valve and replacement by the invented control system does not require the control system to include a check valve.

Control Unit Connections

Connections to and from the control unit electronics assembly are preferably standard automotive connectors as designated by the vehicle manufacturer. Preferably, the control input lines are to be contained on one connector, while the other connector serves for the output lines to various LED lamps and for the +12 v DC and ground connections to power the electronics. Note that alternative embodiments may be adapted to other than 12 volt systems, or as customer-preferred.

Provisions have been made on the "input" side connector for a source 12 v battery and ground, so if at sometime an input interface requires power, it will be available. These two connectors will be of different genders so as to provide protection from unintentional mix up during installation.

Auxiliary Input and Output Lines

Optionally, the control system may be designed to accommodate as many additional inputs as is practical with regards to its impact on printed circuit size and cost. Alternative embodiments, especially micro-chip technology, may include many data ports, including parallel and serial ports.

Auxiliary input lines preferably will respond to inputs that are either switched to ground or to +12 v of the vehicle electrical system. Preferably, if some type of vehicle sensor is employed that does not provide switching to either ground or +12 v of the vehicle electrical system, the conversion to this type switching will have to take place exterior to the designed control circuit, ie. via addition of a switch.

Operating Voltage and Current Handling Limitations

Nominal operating voltage for the preferred system is 10.8 to 13.8 volts direct current. Preferably, the solenoid output leads are limited to dc current loads, ground sourced, of not less than 18 ohms continuous operation at a direct current voltage of not more than 13.8 volts. In the especially-preferred embodiment, the maximum allowable auxiliary power connections are limited to not more than 0.5 amps at 13.8 amps with the brake solenoid energized.

Transient Protection

Transient and over-voltage protection of the circuit may be provided by the strategic placement of various chokes, transient suppresser diodes, filter capacitors, diodes and surge protectors, as would be found necessary and appropriate in view of accepted adequate design practices, once the disclosure of this Description if viewed by one of skill in the art.

Battery Connection Reversal Protection

A 3 amp 200 v diode will be provided in series with the main +12 v battery connections to the unit.

Internal and External Fusing

Operating instructions for the unit will require the use of an external fuse of a maximum amperage rating of 2 amps at 32 volts DC. Internal to the unit, and connected in series with the drain of the pass element transistor, shall be another fuse, rated at 3 amps at 32 volts D.C.

Operating Temperature Range

The desired operating temperature window of the brake control system is from approximately 32 degrees Fahrenheit to approximately 125 degrees Fahrenheit.

Schematics of Solid-State Embodiment Logic and Wiring

Figure 11:
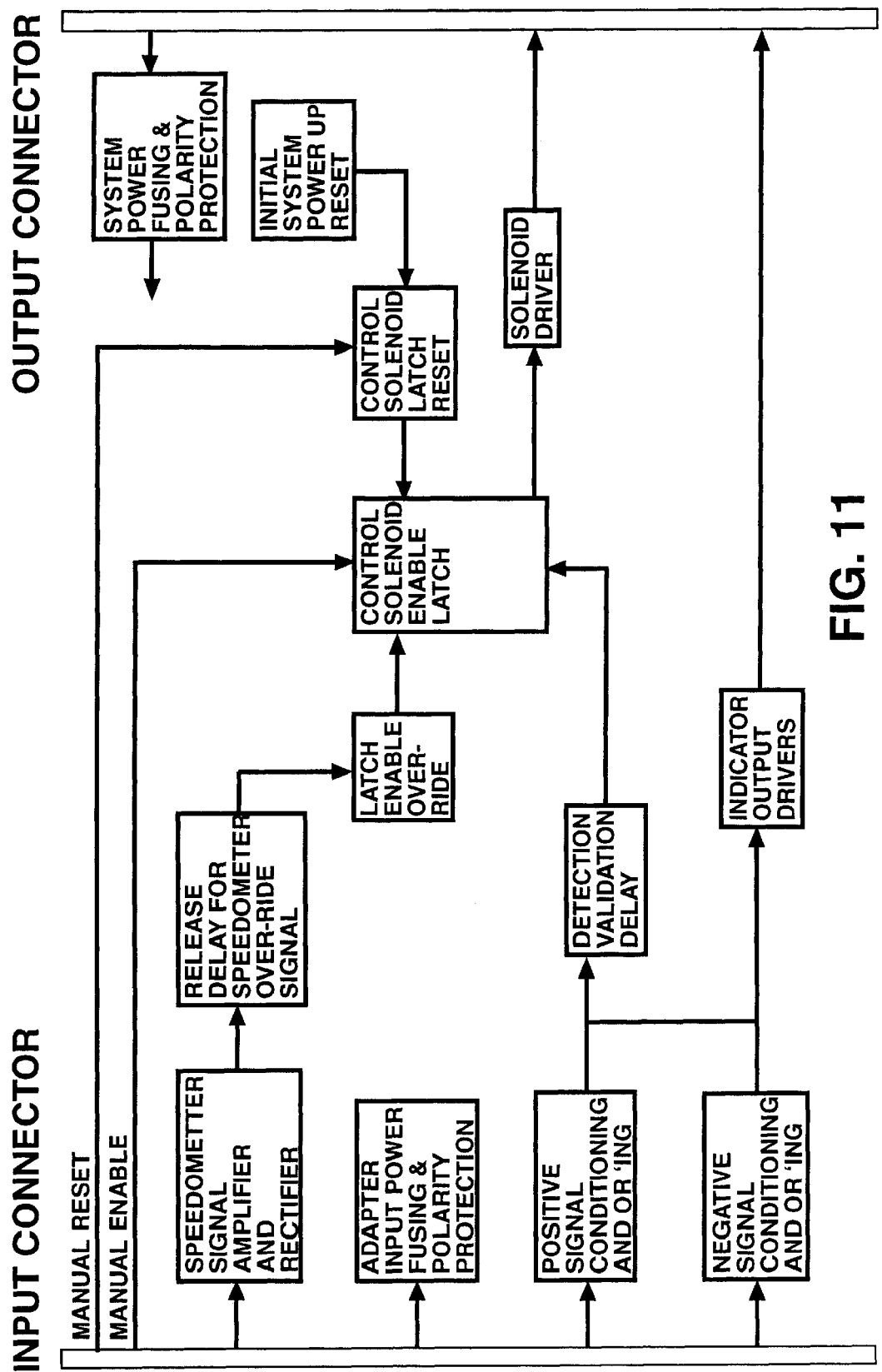
FIG. 11 is a logic diagram for one embodiment of the solid-state embodiment of the invention.
Figure 12:
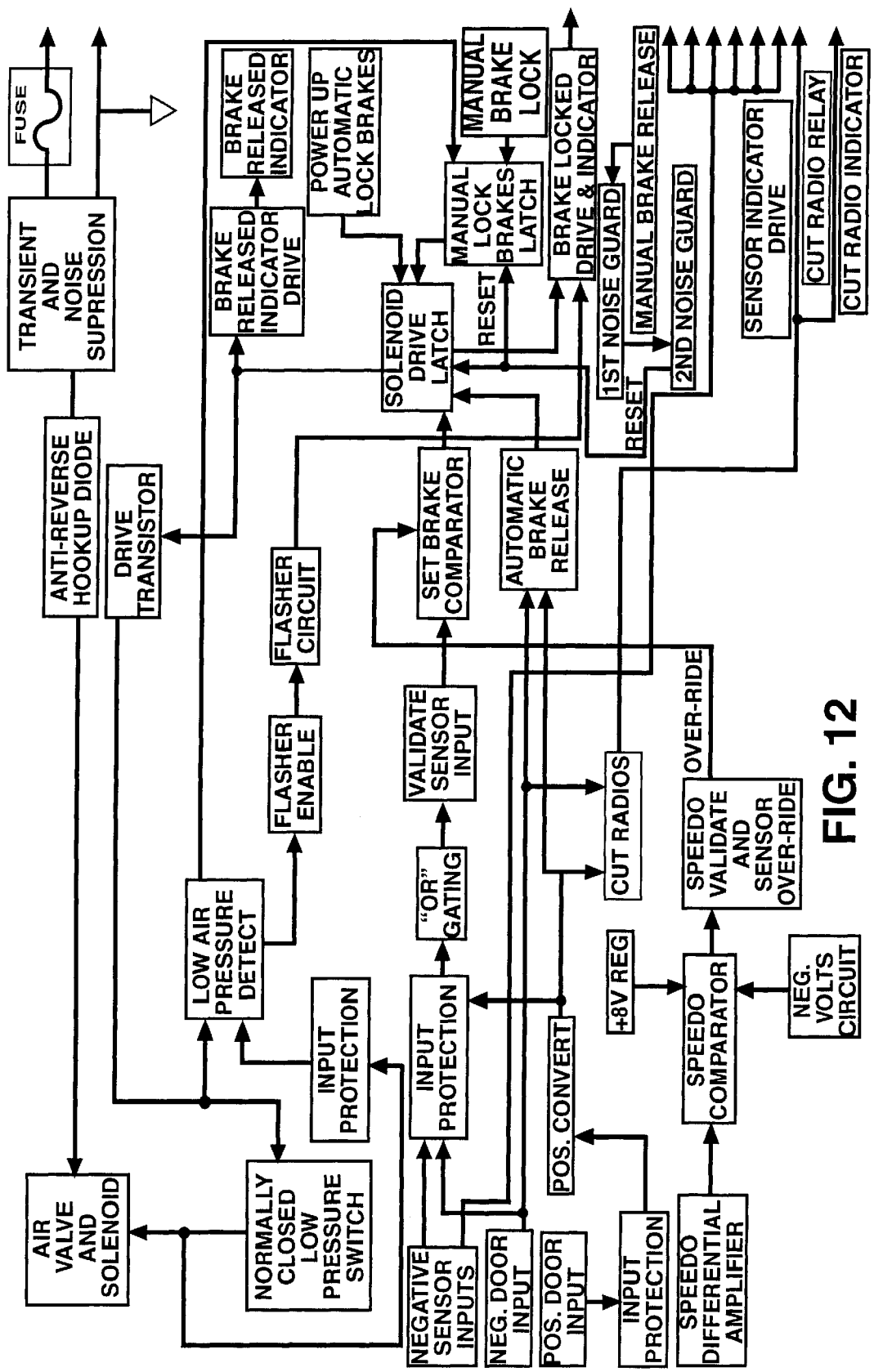
FIG. 12 is a function block diagram for an especially-preferred embodiment of the invented brake control system.

The logic and functions of one solid-state embodiment are portrayed in FIGS. 11 and 12. The controller preferably has burned-in memory so that, when the vehicle engine is off and, therefore, the ignition system does not provide power to the invented unit, battery power is not needed to maintain the memory in the controller and the control system does not drain the vehicle's battery.

HYDRAULIC PARKING BRAKE EMBODIMENTS

Figure 16:
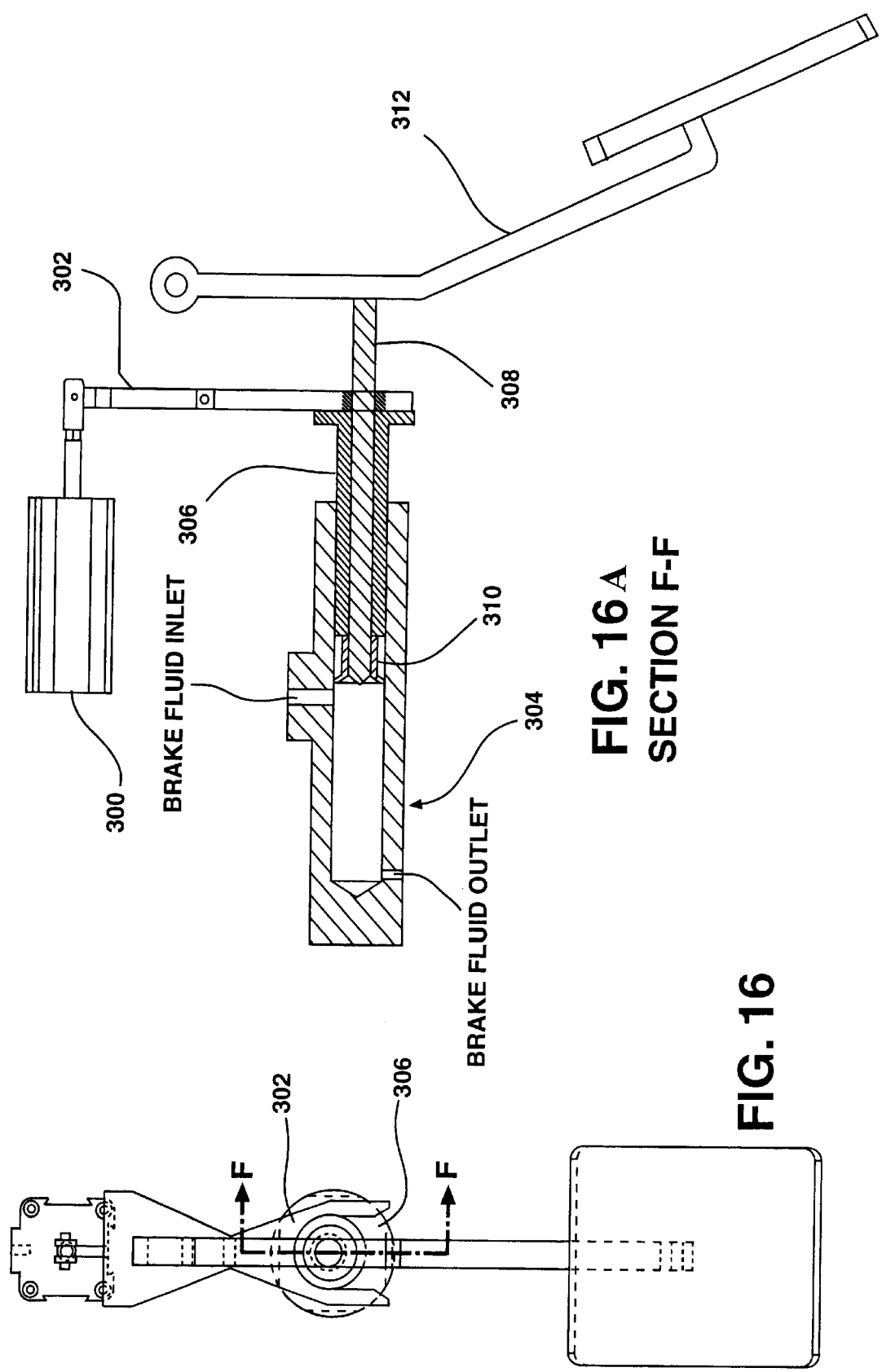
FIG. 16 is a schematic diagram of one embodiment of an invented brake control system for adapting a hydraulic application brake to also serve as a parking brake, by using an electronic controller according to the invention linked to a mechanical actuator operatively connected to a hydraulic master cylinder.
Figure 17:
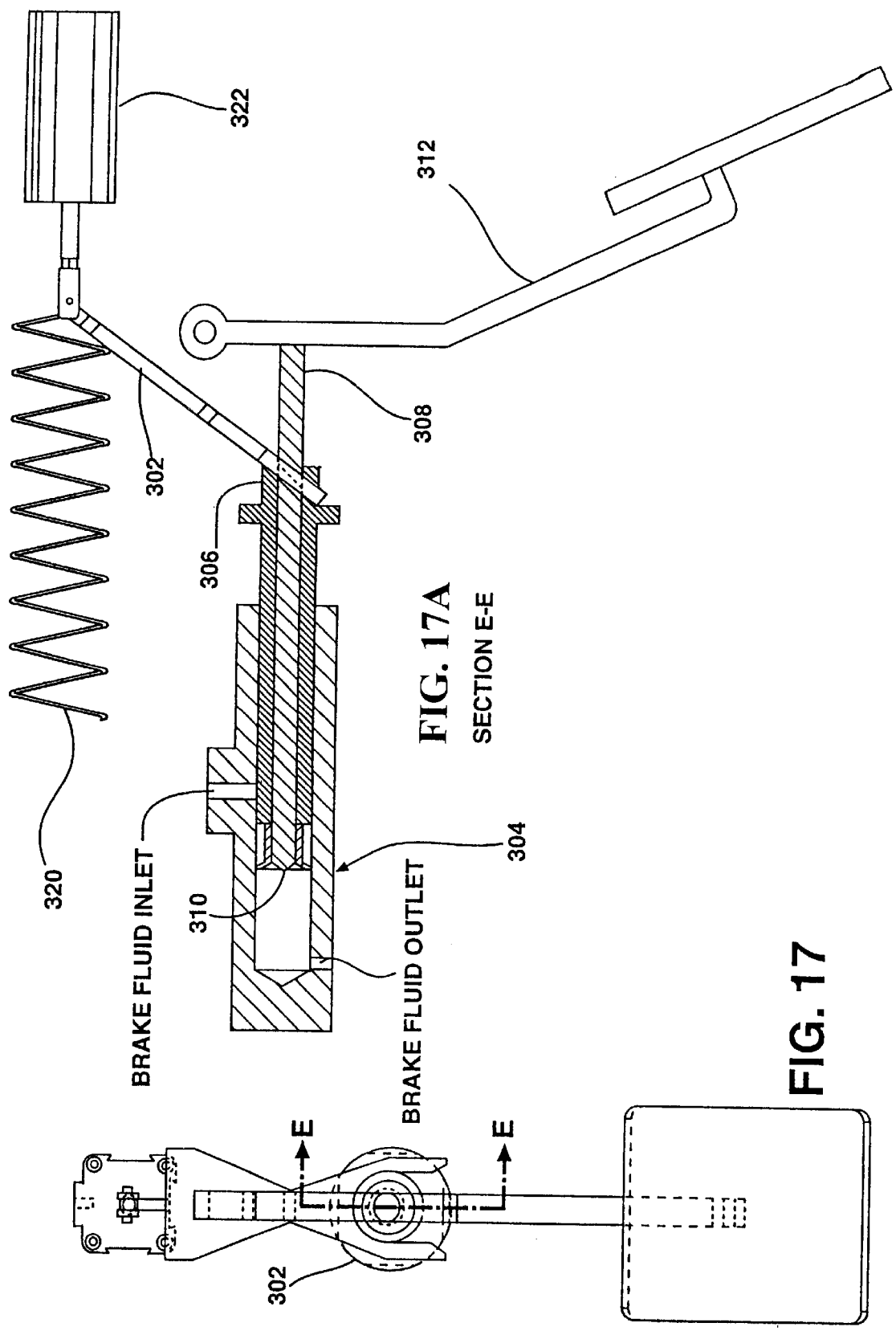
FIG. 17 is a schematic diagram of another embodiment of an invented brake control system for adapting a hydraulic application brake to also serve as a parking brake, by using a spring-biased mechanical actuator, and an electronic controller according to the invention that controls an gaseous or hydraulic fluid brake release mechanism.

The embodiments adapting hydraulic brakes to be used as parking brakes may utilize the same invented electronic controller as the air parking brake mechanism described above, wherein the electronic controller cooperates with management mechanisms as follows:

A) an actuator operatively connected to the hydraulic master cylinder to cause the master cylinder to apply the brakes, as illustrated by FIGS. 16 and 17. The actuator may be a live gas or liquid piston, spring, mechanical screw, electromagnetic or magnetic or other means for reliably actuating the master brake cylinder. The actuator may itself be powered, for example, by a pump, motor, or electricity.

Figure 18:
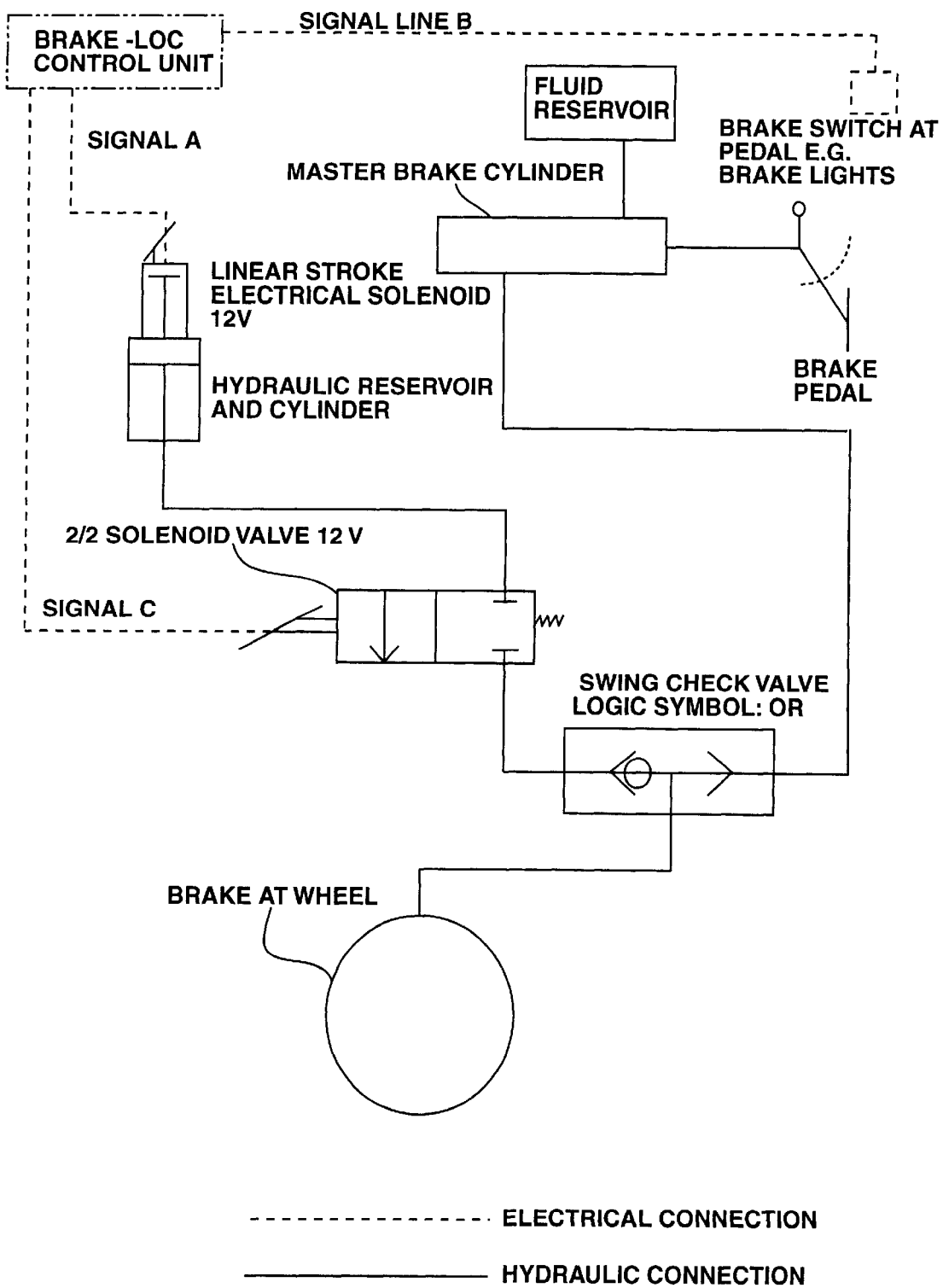
FIGS. 18 and 19 are schematic diagrams of two embodiments of brake control systems for cooperation with a hydraulic application brake, wherein a controller according to the invention controls a pressure generator and valves that are "inserted" between the master cylinder and the brake mechanism to create and manage pressure in the brake fluid line to apply the brake.
Figure 19:
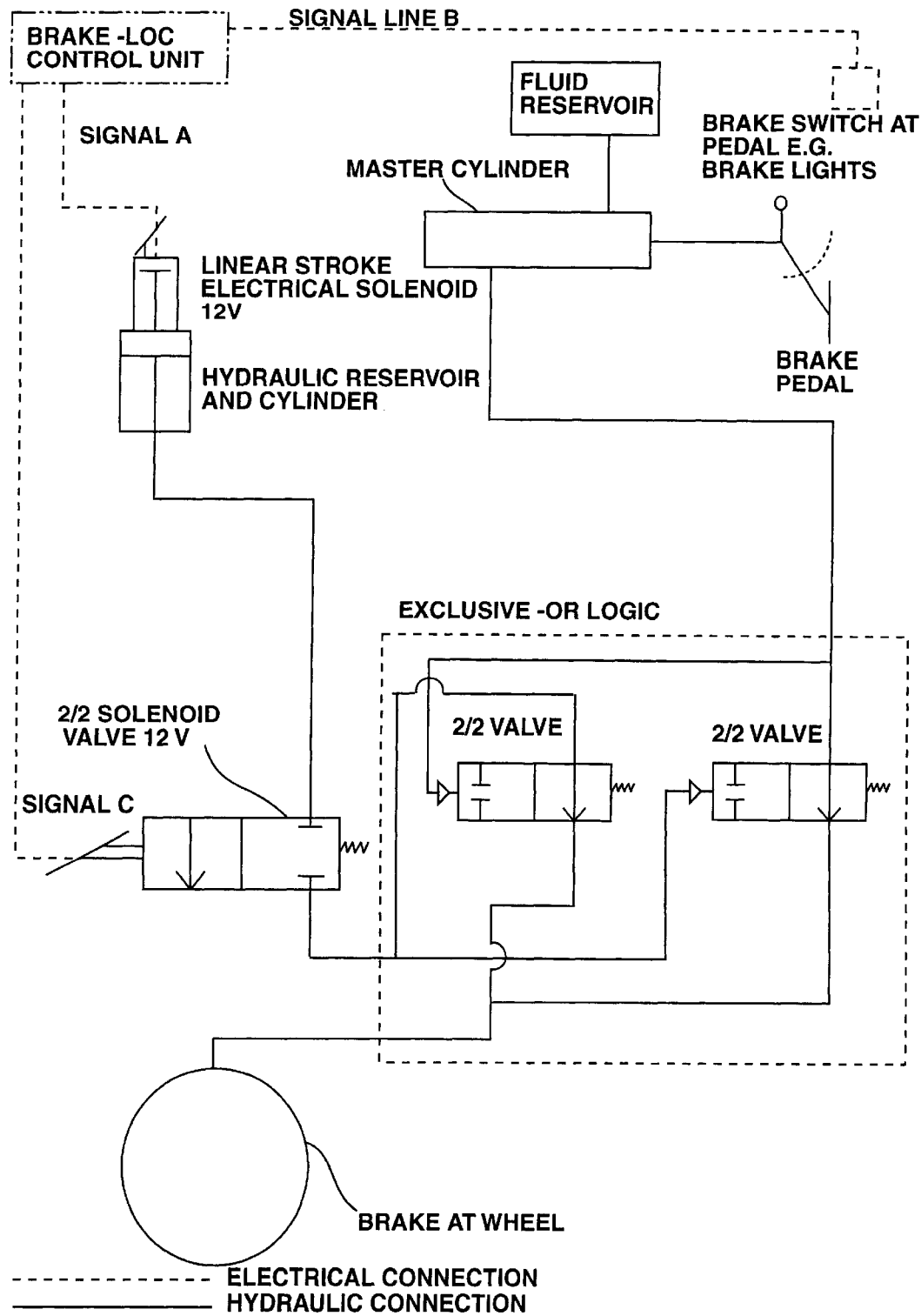

Alternatively, the electronic controller cooperates with:

B) a pressure generator (which is separate from the master cylinder) and valves "inserted" between the master cylinder and the brake mechanism to create and manage pressure in the hydraulic brake fluid line, as illustrated by FIGS. 18 and 19. The "inserted" pressure generator is a hydraulic brake fluid piston (designed like a hydraulic brake master cylinder) that is actuated by live gas or liquid piston, spring, mechanical screw, electromagnetic or magnetic or other means for reliably increasing the hydraulic brake fluid pressure and apply the brakes. The pressure generator may itself be powered, for example, by a pump, motor, or electricity.

FIG. 16 illustrates an actuator of the type in (A) above, in a brakes-released mode. The actuator comprises a secondary actuator 300 operatively connected by secondary linkage 302 to the conventional hydraulic master cylinder 304 to cause the master cylinder to apply the brakes (not shown in FIG. 16). The secondary actuator 300 depicted in FIG. 16 may be a live gas or liquid piston, spring, mechanical screw, electromagnetic or magnetic or other means for reliably actuating the master brake cylinder. The secondary linkage 302 engages and powers a secondary piston rod 306, which is preferably a sleeve that encircles primary piston rod 308 and moves independently of primary piston rod 308 to move the piston 310 of master cylinder 304. Preferably, the secondary piston rod 306 coaxially surrounds the primary piston rod 308 so that the secondary piston rod is axially slidable relative to the primary piston rod. With this configuration, the brake pedal 312 may be used as normal to move the piston 310 during normal driving, while the invented combination of actuator 300, linkage 302, and secondary piston rod 306 are controlled by the invented controller to automatically apply the brake. When the invented controller releases the brake, the secondary actuator 300 returns the secondary linkage 302 to the position shown in FIG. 16, allowing the inherent spring return in the master cylinder 304 to force the piston 310 and secondary piston rod out to a brake-released position.

FIG. 17 illustrates another actuator of the type in (A) above in a brake-applied mode. The secondary actuator in this embodiment is a spring 320 that biases the secondary linkage 302 to force the secondary piston rod 306 to move the piston 310 and apply the brakes. In FIG. 17, the spring consistently biases the secondary linkage 302 and, when the invented controller signals for brake release, the brake release unit 322 counteracts the spring 320 so that the inherent spring return in the master cylinder 304 may force the piston 310 and secondary piston rod out to a brake-released position.

In addition, it should be noted that systems such as are shown in FIG. 16 and 17 could also be adapted for use with vehicles with vacuum-assist.

In FIG. 18, a brake controller according to the invention includes a fluid management mechanism that includes one of various pressure generator units positioned between the master cylinder and the brake at the wheel to establish and maintain the pressure applied to the brake at the wheel. The controller according to the invention receives signals from the sensors around/in the vehicle and then signals the fluid management mechanism. The pressure generator is shown as a linear stroke electrical solenoid with hydraulic reservoir and cylinder, but may be various pressure generators adapted to safely be inserted into the hydraulic brake line, for example, a short stroke solenoid, a spring loaded hydraulic piston, or others.

The controller in FIG. 19 communicates with a solenoid valve, the linear stroke electrical solenoid, and, optionally, also with a brake switch at the pedal. The illustrated communication with the brake switch is adapted to provide a manual brake-releasing override for an emergency over-ride of the controller, for example, if the controller or other feature of the system malfunctions and the operator must be able to release the brakes to get the vehicle to the side of the road. To over-ride the controller, the operator may press "slightly" or "partially" on the brake pedal, and the brake light switch will over-ride the controller. As long as the operator keeps his foot in that "partially depressed" position on the pedal, the controller will be over-ridden. This requires a positive action on the part of the operator, and one which requires careful attention by the operator, so that the vehicle may be pulled over to the side of the road out of traffic. The controller is adapted, however, that if the ignition switch is opened (in the vehicle "off" position), the over-ride will not be possible.

FIG. 19 illustrates another embodiment for a hydraulic brake safety system according to the invention. Examples of solenoid valves that may be used as the pressure generator in embodiments for hydraulic brakes may be those that create a pull force or push force substantial enough for the fluid requirements of the system. For example, pressure generating solenoids such as those offered by Synchro-Sturt Products, Inc. may be appropriate, such as model 1502, 1502ES, 1504, the 1751 or 1753 series (including ES), 1756 or 1757 series (ES, ESDB), 2001 or 2003 series, or the 2370 series.

Figure 20:
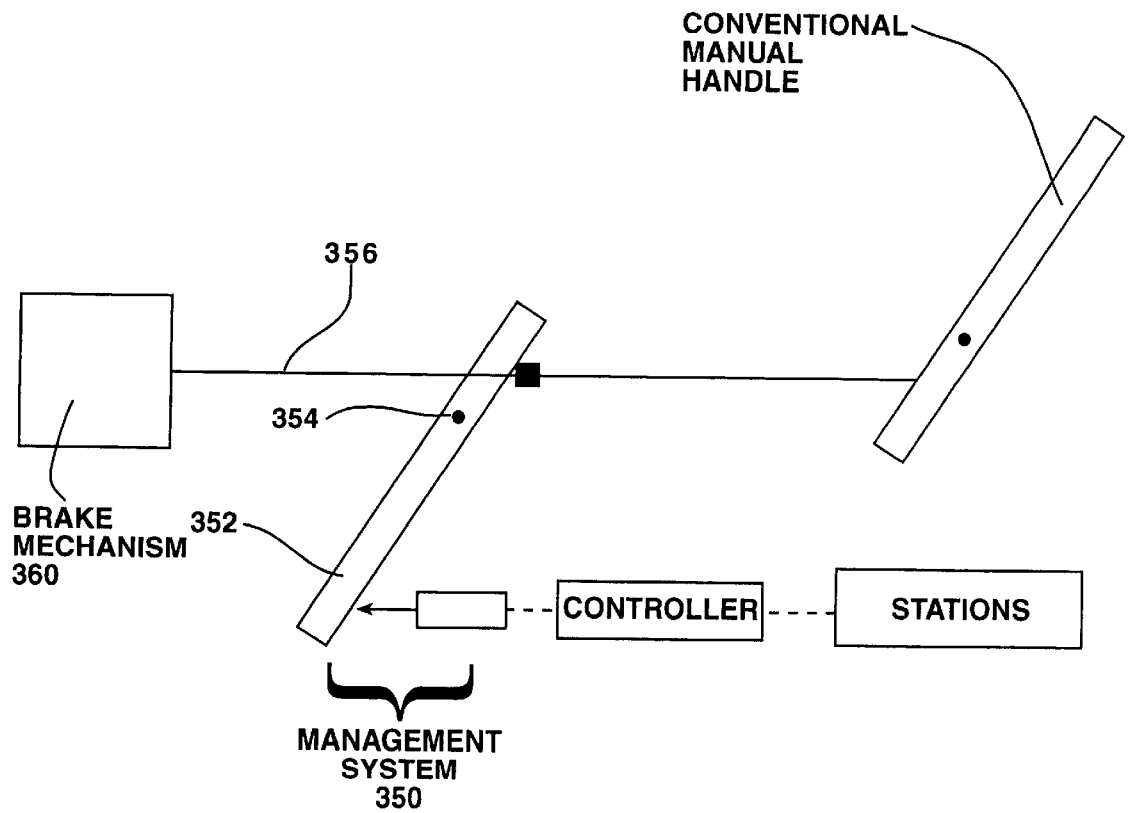
FIG. 20 is a schematic diagram of one embodiment of the invented brake control system installed on a mechanical brake.

FIG. 20 illustrates one of many embodiments of the invention that may be used with a mechanical brake system. For example, the invented controller may respond to signals from various sensors/switches by signaling management system 350 to apply the mechanical brake. Specifically, the management system includes a device 350 that moves lever 352 to pivot at pivot point 354 to pull brake cable or mechanical linkage 356 to apply the brake mechanism 360 at the back wheels or the driveline. Alternatively, the invented controller may be used with other mechanical or electric brake systems that cooperate either with the driveline or the two back wheel brakes.

Thus, as may be seen from this description, the various stations in/around the vehicle may include moving or moveable equipment in/on the vehicle, monitors of operator or passenger position or movement, monitors of the condition of the vehicle operator, or other monitors. Various other embodiments may also be included, all of which preferably, but not always, work from the basis of "when electricity is cut off" (not "when electricity is supplied") in the various circuits of the controller, the controller applies the brakes.

Although this invention has been described above with reference to particular means, materials and embodiments, it is to be understood that the invention is not limited to these disclosed particulars, but extends instead to all equivalents within the scope of the following claims.

What is claimed is:

1. A safety system for use with a brake mechanism of a vehicle, the safety system adapted to monitor conditions at a plurality of stations at the vehicle to determine whether vehicle movement should be permitted, the safety system comprising:

a management mechanism adapted to apply the brake mechanism to inhibit vehicle movement;

a plurality of sensors adapted to be at stations in the vehicle and adapted to sense conditions at the stations;

a solid-state controller operatively connected to the management mechanism and to the plurality of sensors, wherein the controller is adapted to receive signals from the plurality of sensors and, in response to signals from the plurality of sensors indicating a condition that is unsafe for vehicle movement, to actuate the management mechanism to apply the brakes, wherein the management mechanism comprises a vented solenoid valve adapted to block and vent an air line in an air brake, wherein the blocking and venting of said air line applies the brake mechanism.

2. The safety system as in claim 1, wherein said plurality of sensors comprises a sensor selected from the group consisting of: a sensor adapted to sense equipment location at one of said stations, a sensor adapted to sense equipment movement at one of said stations, a sensor adapted to sense location of people at one of said stations, a sensor adapted to sense movement of people at one of said stations, a door switch that signals the controller if a door is not closed, a wheelchair lift switch that signals the controller if a wheelchair lift is in use, an engine diagnostic sensor, a vehicle diagnostic sensor, a low tire pressure sensor, a low engine oil pressure sensor, an air brake air supply pressure sensor, a sensor that signals the controller if objects or people are close to the vehicle, a breath alcohol analyzer, and an access-code key-pad.

3. The safety system of claim 1, wherein the vehicle has an ignition switch, and wherein the controller has a positive power input adapted to be operatively connected to the ignition switch, so that opening the ignition switch shuts off power to the controller, which causes the management mechanism to apply the brake mechanism.

4. A safety system for use with a brake mechanism of a vehicle, the safety system adapted to monitor conditions at a plurality of stations at the vehicle to determine whether vehicle movement should be permitted, the safety system comprising:

a management mechanism adapted to apply the brake mechanism to inhibit vehicle movement;

a plurality of sensors adapted to be at stations in the vehicle and adapted to sense conditions at the stations;

a solid-state controller operatively connected to the management mechanism and to the plurality of sensors, wherein the controller is adapted to receive signals from the plurality of sensors and, in response to signals from the plurality of sensors indicating a condition that is unsafe for vehicle movement, to actuate the management mechanism to apply the brakes, wherein the vehicle comprises a hydraulic master cylinder having a piston for increasing brake fluid pressure in a brake fluid line connected to a hydraulic brake mechanism, and a primary piston rod operated by a foot pedal in a driver's cab for powering the piston, wherein the management mechanism comprises a secondary piston rod in the master cylinder adapted to move the piston to increase hydraulic brake fluid in the brake fluid line, and an actuator for powering the secondary piston rod.

5. The safety system of claim 4, wherein the secondary piston rod is a sleeve slidably extending around the primary piston rod.

6. A safety system for use with a brake mechanism of a vehicle, the safety system adapted to monitor conditions at a plurality of stations at the vehicle to determine whether vehicle movement should be permitted, the safety system comprising:

a management mechanism adapted to apply the brake mechanism to inhibit vehicle movement;

a plurality of sensors adapted to be at stations in the vehicle and adapted to sense conditions at the stations;

a solid-state controller operatively connected to the management mechanism and to the plurality of sensors, wherein the controller is adapted to receive signals from the plurality of sensors and, in response to signals from the plurality of sensors indicating a condition that is unsafe for vehicle movement, to actuate the management mechanism to apply the brakes, wherein the vehicle comprises a hydraulic master cylinder having a piston for increasing brake fluid pressure in a brake fluid line connected to a hydraulic brake mechanism, and a primary piston rod operated by a foot pedal in a driver's cab for powering the piston, the management mechanism comprising:
- a secondary piston rod in the master cylinder adapted to move the piston to increase hydraulic brake fluid in the brake fluid line, and a spring biasing the secondary piston rod to apply the brake mechanism; and
- a release unit counteracting the spring to release the brake, the release unit being controlled by the controller.

7. A safety system for use with a brake mechanism of a vehicle, the safety system adapted to monitor conditions at a plurality of stations at the vehicle to determine whether vehicle movement should be permitted, the safety system comprising:
- a management mechanism adapted to apply the brake mechanism to inhibit vehicle movement;
- a plurality of sensors adapted to be at stations in the vehicle and adapted to sense conditions at the stations;
- a solid-state controller operatively connected to the management mechanism and to the plurality of sensors, wherein the controller is adapted to receive signals from the plurality of sensors and, in response to signals from the plurality of sensors indicating a condition that is unsafe for vehicle movement, to actuate the management mechanism to apply the brakes, wherein one of said plurality of sensors is a vehicle motion sensor, and wherein the controller does not actuate the management mechanism to apply the brake mechanism if the vehicle motion sensor signals the controller that the vehicle is moving above a certain speed.

8. A safety system for use with a brake mechanism of a vehicle, the safety system adapted to monitor conditions at a plurality of stations at the vehicle to determine whether vehicle movement should be permitted, the safety system comprising:
- a management mechanism adapted to apply the brake mechanism to inhibit vehicle movement;
- a plurality of sensors adapted to be at stations in the vehicle and adapted to sense conditions at the stations;
- a solid-state controller operatively connected to the management mechanism and to the plurality of sensors, wherein the controller is adapted to receive signals from the plurality of sensors and, in response to signals from the plurality of sensors indicating a condition that is unsafe for vehicle movement, to actuate the management mechanism to apply the brakes, wherein the controller comprises a signal validation circuit that validates signals from the sensors for acceptance by the controller only if the signals arrive at the controller, uninterrupted, for a predetermined minimum duration of time.

9. A safety system for use with a brake mechanism of a vehicle, the safety system comprising:
- a management mechanism adapted to apply a brake mechanism to inhibit vehicle movement;
- a plurality of sensors adapted to be located at a plurality of stations in the vehicle and adapted to sense conditions at the stations;
- a controller operatively connected to the management mechanism and to the plurality of sensors, wherein the controller is adapted to receive signals from the plurality of sensors and, in response to signals from the plurality of sensors indicating a condition that is unsafe for vehicle movement, to actuate the management mechanism to apply the brakes;
- the safety system further comprising a vehicle motion override system comprising one of said plurality of sensors being a vehicle motion sensor, wherein the controller does not actuate the management mechanism to apply the brake mechanism if the vehicle motion sensor signals that controller that the vehicle is moving above a certain speed.

10. The safety system of claim 9, wherein the vehicle motion sensor is operatively connected to a speedometer pickup.

11. The safety system of claim 9, further comprising a manual brake-releasing override adapted to release the brake mechanism when the management mechanism has applied the brake mechanism.

12. The safety system of claim 11, wherein the manual brake-releasing override comprises a valve spool of an air valve being accessible to a driver so that the driver pushes on the valve spool to allow air through the air valve to release the brake mechanism.

13. A method of controlling brakes in a vehicle comprising:
- providing a plurality of sensors at locations on the vehicle, the sensors adapted to sense conditions the make vehicle movement unsafe;
- providing a controller that responds, to signals from the plurality of sensors indicating an unsafe condition, by actuating a management mechanism that applies vehicle brakes;
- wherein the controller validates the signals from the plurality of sensors after the signals are uninterrupted for a certain amount of time and wherein the controller only actuates the management mechanism in response to validated signals.

14. The method of controlling brakes of claim 13, further comprising sensing vehicle movement and wherein the controller only actuates the management mechanism if the vehicle is not in motion above a certain speed.

15. The method of controlling brakes of claim 13, further comprising providing an operator manual switch electrically connected to the controller, and the controller signaling the management mechanism to release the brakes when the sensors no longer indicate unsafe conditions and after an operator has switched the manual switch to a brake-release position.

16. The method of controlling brakes of claim 15, further comprising the operator switching the manual switch to a brake-apply position, and the controller actuating the management mechanism to apply the brakes.

17. The method of controlling brakes of claim 16, further comprising sensing vehicle movement and wherein the controller only actuates the management mechanism if the vehicle is not in motion above a certain speed, except when the operator has switched the manual switch to a brake-apply position.

18. The safety system as in claim 4, wherein said plurality of sensors comprises a sensor selected from the group consisting of: a sensor adapted to sense equipment location at one of said stations, a sensor adapted to sense equipment movement at one of said stations, a sensor adapted to sense location of people at one of said stations, a sensor adapted to sense movement of people at one of said stations, a door switch that signals the controller if a door is not closed, a wheelchair lift switch that signals the controller if a wheelchair lift is in use, an engine diagnostic sensor, a vehicle diagnostic sensor, a low tire pressure sensor, a low engine oil pressure sensor, an air brake air supply pressure sensor, a sensor that signals the controller if objects or people are close to the vehicle, a breath alcohol analyzer, and an access-code key-pad.

19. The safety system as in claim 6, wherein said plurality of sensors comprises a sensor selected from the group consisting of: a sensor adapted to sense equipment location at one of said stations, a sensor adapted to sense equipment movement at one of said stations, a sensor adapted to sense location of people at one of said stations, a sensor adapted to sense movement of people at one of said stations, a door switch that signals the controller if a door is not closed, a wheelchair lift switch that signals the controller if a wheelchair lift is in use, an engine diagnostic sensor, a vehicle diagnostic sensor, a low tire pressure sensor, a low engine oil pressure sensor, an air brake air supply pressure sensor, a sensor that signals the controller if objects or people are close to the vehicle, a breath alcohol analyzer, and an access-code key-pad.

20. The safety system as in claim 7, wherein said plurality of sensors comprises a sensor selected from the group consisting of: a sensor adapted to sense equipment location at one of said stations, a sensor adapted to sense equipment movement at one of said stations, a sensor adapted to sense location of people at one of said stations, a sensor adapted to sense movement of people at one of said stations, a door switch that signals the controller if a door is not closed, a wheelchair lift switch that signals the controller if a wheelchair lift is in use, an engine diagnostic sensor, a vehicle diagnostic sensor, a low tire pressure sensor, a low engine oil pressure sensor, an air brake air supply pressure sensor, a sensor that signals the controller if objects or people are close to the vehicle, a breath alcohol analyzer, and an access-code key-pad.

21. The safety system as in claim 8, wherein said plurality of sensors comprises a sensor selected from the group consisting of: a sensor adapted to sense equipment location at one of said stations, a sensor adapted to sense equipment movement at one of said stations, a sensor adapted to sense location of people at one of said stations, a sensor adapted to sense movement of people at one of said stations, a door switch that signals the controller if a door is not closed, a wheelchair lift switch that signals the controller if a wheelchair lift is in use, an engine diagnostic sensor, a vehicle diagnostic sensor, a low tire pressure sensor, a low engine oil pressure sensor, an air brake air supply pressure sensor, a sensor that signals the controller if objects or people are close to the vehicle, a breath alcohol analyzer, and an access-code key-pad.

22. The safety system as in claim 9, wherein said plurality of sensors comprises a sensor selected from the group consisting of: a sensor adapted to sense equipment location at one of said stations, a sensor adapted to sense equipment movement at one of said stations, a sensor adapted to sense location of people at one of said stations, a sensor adapted to sense movement of people at one of said stations, a door switch that signals the controller if a door is not closed, a wheelchair lift switch that signals the controller if a wheelchair lift is in use, an engine diagnostic sensor, a vehicle diagnostic sensor, a low tire pressure sensor, a low engine oil pressure sensor, an air brake air supply pressure sensor, a sensor that signals the controller if objects or people are close to the vehicle, a breath alcohol analyzer, and an access-code key-pad.

23. The method of controlling brakes as in claim 13, wherein said plurality of sensors comprises a sensor selected from the group consisting of: a sensor adapted to sense equipment location at one of said stations, a sensor adapted to sense equipment movement at one of said stations, a sensor adapted to sense location of people at one of said stations, a sensor adapted to sense movement of people at one of said stations, a door switch that signals the controller if a door is not closed, a wheelchair lift switch that signals the controller if a wheelchair lift is in use, an engine diagnostic sensor, a vehicle diagnostic sensor, a low tire pressure sensor, a low engine oil pressure sensor, an air brake air supply pressure sensor, a sensor that signals the controller if objects or people are close to the vehicle, a breath alcohol analyzer, and an access-code key-pad.

24. The safety system of claim 8, wherein said predetermined minimum duration of time is in the range of 1 to 2 seconds.

25. The safety system of claim 8, wherein said predetermined minimum duration of time is in the range of 0.5 to 1.25 seconds.

26. The safety system of claim 7, wherein said management mechanism is adapted to apply a brake mechanism selected from the group consisting of: an air-actuated brake mechanism, a hydraulic-oil-actuated brake mechanism, a spring-actuated brake mechanism, an electrically-actuated brake mechanism, and a mechanically-actuated brake mechanism.

27. The safety system of claim 8, wherein said management mechanism is adapted to apply a brake mechanism selected from the group consisting of: an air-actuated brake mechanism, a hydraulic-oil-actuated brake mechanism, a spring-actuated brake mechanism, an electrically-actuated brake mechanism, and a mechanically-actuated brake mechanism.

28. The safety system of claim 9, wherein said management mechanism is adapted to apply a brake mechanism selected from the group consisting of: an air-actuated brake mechanism, a hydraulic-oil-actuated brake mechanism, a spring-actuated brake mechanism, an electrically-actuated brake mechanism, and a mechanically-actuated brake mechanism.

29. The method of controlling brakes of claim 13, wherein said management mechanism is adapted to apply a brake mechanism selected from the group consisting of: an air-actuated brake mechanism, a hydraulic-oil-actuated brake mechanism, a spring-actuated brake mechanism, an electrically-actuated brake mechanism, and a mechanically-actuated brake mechanism.

30. The safety system of claim 1, further comprising a manually-operated operator switch electrically connected to the controller, said operator switch being movable by the operator to an activate position directing the controller to apply the brake mechanism, and said operator switch being movable to a release position directing the controller to release the brake mechanism if said sensors no longer signal any unsafe condition to the controller.

31. The safety system of claim 4, further comprising a manually-operated operator switch electrically connected to the controller, said operator switch being movable by the operator to an activate position directing the controller to apply the brake mechanism, and said operator switch being movable to a release position directing the controller to release the brake mechanism if said sensors no longer signal any unsafe condition to the controller.

32. The safety system of claim 6, further comprising a manually-operated operator switch electrically connected to the controller, said operator switch being movable by the operator to an activate position directing the controller to apply the brake mechanism, and said operator switch being movable to a release position directing the controller to release the brake mechanism if said sensors no longer signal any unsafe condition to the controller.

33. The safety system of claim 7, further comprising a manually-operated operator switch electrically connected to the controller, said operator switch being movable by the operator to an activate position directing the controller to apply the brake mechanism, and said operator switch being movable to a release position directing the controller to release the brake mechanism if said sensors no longer signal any unsafe condition to the controller.

34. The safety system of claim 8, further comprising a manually-operated operator switch electrically connected to the controller, said operator switch being movable by the operator to an activate position directing the controller to apply the brake mechanism, and said operator switch being movable to a release position directing the controller to release the brake mechanism if said sensors no longer signal any unsafe condition to the controller.

35. The safety system of claim 9, further comprising a manually-operated operator switch electrically connected to the controller, said operator switch being movable by the operator to an activate position directing the controller to apply the brake mechanism, and said operator switch being movable to a release position directing the controller to release the brake mechanism if said sensors no longer signal any unsafe condition to the controller.

36. The method of controlling brakes of claim 13, further comprising switching a manually-operated operator switch, that is electrically connected to the controller, to a release position directing the controller to release the brake mechanism if said sensors no longer signal any unsafe condition to the controller.

37. The safety system as in claim 1 that is for use with a parking brake mechanism of a vehicle, wherein the management mechanism is adapted to apply the parking brake mechanism when the vehicle is parked to inhibit vehicle movement.

38. The safety system as in claim 4 that is for use with a parking brake mechanism of a vehicle, wherein the management mechanism is adapted to apply the parking brake mechanism when the vehicle is parked to inhibit vehicle movement.

39. The safety system as in claim 6 that is for use with a parking brake mechanism of a vehicle, wherein the management mechanism is adapted to apply the parking brake mechanism when the vehicle is parked to inhibit vehicle movement.

40. The safety system as in claim 7 that is for use with a parking brake mechanism of a vehicle, wherein the management mechanism is adapted to apply the parking brake mechanism when the vehicle is parked to inhibit vehicle movement.

41. The safety system as in claim 8 that is for use with a parking brake mechanism of a vehicle, wherein the management mechanism is adapted to apply the parking brake mechanism when the vehicle is parked to inhibit vehicle movement.

42. The safety system as in claim 9 that is for use with a parking brake mechanism of a vehicle, wherein the management mechanism is adapted to apply the parking brake mechanism when the vehicle is parked to inhibit vehicle movement.

43. The method of controlling brakes as in claim 13 that is for controlling a parking brake mechanism of a vehicle, wherein the management mechanism is adapted to apply the parking brake mechanism when the controller responds, to signals from the plurality of sensors indicating an unsafe condition, by actuating a management mechanism that applies the vehicle parking brake to prevent the vehicle from moving from a parked position.

* * * * *